US012670127B2

(12) United States Patent
Armangau

(10) Patent No.: US 12,670,127 B2
(45) Date of Patent: Jun. 30, 2026

(54) TEMPORARY MAPPING TO AVOID CHAIN OF VIRTUALS FOR BACKGROUND DEDUPLICATION

(71) Applicant: Dell Products L.P., Round Rock, TX (US)

(72) Inventor: Philippe Armangau, Kalispell, MT (US)

(73) Assignee: Dell Products L.P., Round Rock, TX (US)

( * ) Notice: Subject to any disclaimer, the term of this patent is extended or adjusted under 35 U.S.C. 154(b) by 12 days.

(21) Appl. No.: 18/988,545

(22) Filed: Dec. 19, 2024

(65) Prior Publication Data

US 2026/0178545 A1 Jun. 25, 2026

(51) Int. Cl.
*G06F 16/17* (2019.01)
*G06F 16/13* (2019.01)
*G06F 16/174* (2019.01)

(52) U.S. Cl.
CPC .......... *G06F 16/1752* (2019.01); *G06F 16/13* (2019.01); *G06F 16/1744* (2019.01)

(58) Field of Classification Search
CPC ... G06F 16/1752; G06F 16/13; G06F 16/1744
USPC ........................................................ 707/692
See application file for complete search history.

(56) References Cited

U.S. PATENT DOCUMENTS

| | | | | |
|---|---|---|---|---|
| 8,983,899 | B1 * | 3/2015 | Ghait .................... | G06F 16/184 |
| | | | | 707/604 |
| 9,934,163 | B1 * | 4/2018 | Armangau .......... | G06F 12/0804 |
| 11,093,454 | B2 * | 8/2021 | Armangau .......... | G06F 16/1748 |
| 2016/0179395 | A1 * | 6/2016 | Fisher .................... | G06F 3/0688 |
| | | | | 711/103 |
| 2016/0364180 | A1 * | 12/2016 | Romanovskiy ..... | G06F 12/0261 |
| 2018/0173731 | A1 * | 6/2018 | Nazari .................. | G06F 3/0641 |
| 2019/0129639 | A1 * | 5/2019 | Armangau ............ | G06F 16/137 |
| 2023/0169046 | A1 * | 6/2023 | Gupta ................. | H04L 67/1095 |
| | | | | 707/634 |
| 2023/0237029 | A1 * | 7/2023 | Tal ........................ | G06F 16/215 |
| | | | | 707/692 |

* cited by examiner

*Primary Examiner* — Hicham Skhoun
(74) *Attorney, Agent, or Firm* — Amin, Turocy & Watson, LLP

(57) ABSTRACT

A system can create a first, persistent, data structure that indicates a location of an ingested file within a log filesystem. The system can, based on not deduplicating the file at ingest, create a second, temporary, data structure that indicates the location of the file, which comprises a logical backpointer to the file. The system can perform deduplication after creating the second data structure, comprising parsing a chunk descriptor associated with the file to identify the second data structure, identifying any active first virtual mapping structures associated with the file, identifying a deduplicated block associated with the file, updating a leaf mapping block of the file to point to a virtual pointer that identifies data associated with the deduplicated block, based on the logical backpointer of the second data structure, and after processing any second virtual mapping structures of the chunk, freeing the second data structure.

20 Claims, 12 Drawing Sheets

100

100
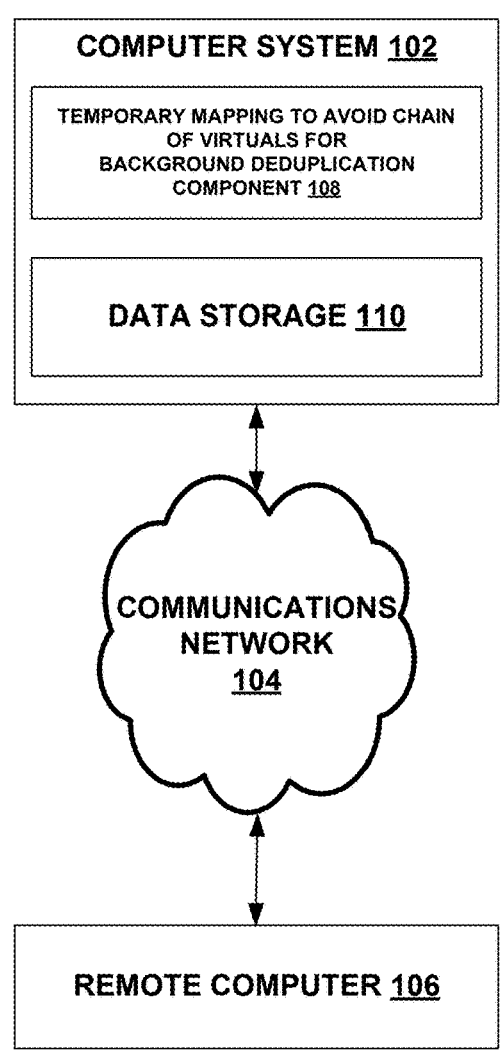
COMPUTER SYSTEM 102
TEMPORARY MAPPING TO AVOID CHAIN
OF VIRTUALS FOR
BACKGROUND DEDUPLICATION
COMPONENT 108
DATA STORAGE 110
COMMUNICATIONS
NETWORK
104
REMOTE COMPUTER 106
FIG. 1

200
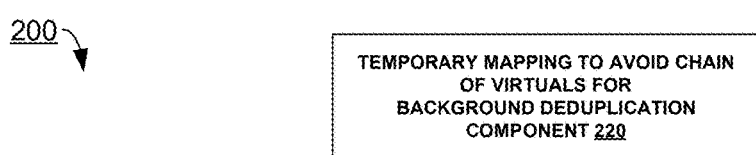
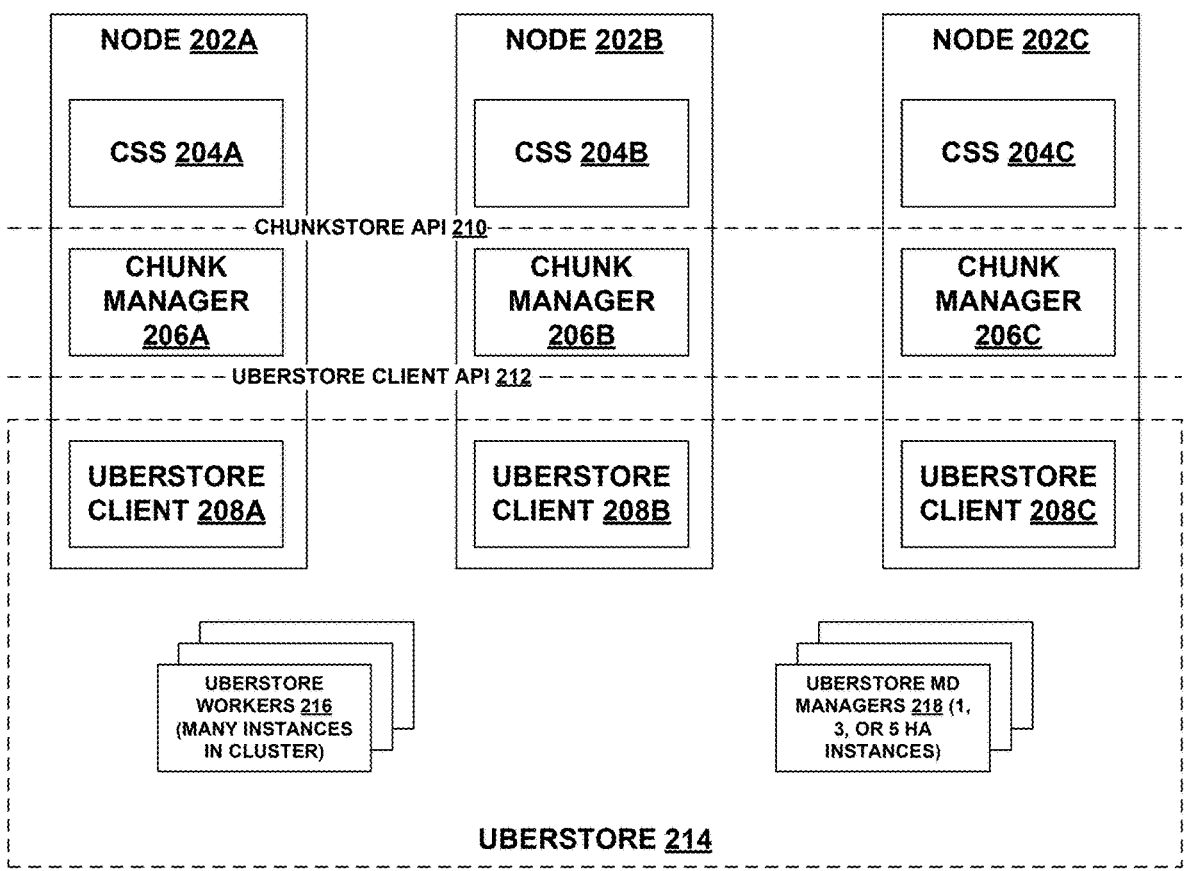
FIG. 2

300

800

Shadow VCE

/dir/foo 802

LIN Tree 804

Inode A 806

IFM Tree 808

- Inode A
- Snap ID
- File Offset

IFM Leaf 810 | Virtual Pointer 812

Shadow VCE 814A | Logical Back pointer 816A

Shadow VCE 814B | Logical Back pointer 816B

*Optional Back Pointer*

VCE 818A | Virtual 826

VCE 818B

VCE 818C

Chunk Descriptor 820

By Math

Compressed Data 822 | Chunk 824 (2MB)

900

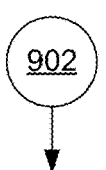

902

INGESTING A FILE INTO A LOG FILESYSTEM 904

OMITTING A DEDUPLICATION OPERATION ON THE FILE AT A TIME OF THE INGESTING 906

BASED ON THE INGESTING, CREATING A FIRST DATA STRUCTURE THAT INDICATES A LOCATION OF THE FILE WITHIN THE LOG FILESYSTEM, WHEREIN THE FIRST DATA STRUCTURE IS PERSISTENT FOR A DURATION OF THE FILE BEING STORED IN THE LOG FILESYSTEM 908

BASED ON THE OMITTING OF THE DEDUPLICATION OPERATION ON THE FILE AT THE TIME OF THE INGESTING, CREATING A SECOND DATA STRUCTURE THAT INDICATES THE LOCATION OF THE FILE WITHIN THE LOG FILESYSTEM, WHEREIN THE SECOND DATA STRUCTURE COMPRISES A LOGICAL BACKPOINTER TO THE FILE IN THE LOG FILESYSTEM, AND WHEREIN THE SECOND DATA STRUCTURE IS PERSISTENT UNTIL THE DEDUPLICATION OPERATION IS PERFORMED ON THE FILE 910

PERFORMING THE DEDUPLICATION OPERATION SUBSEQUENT TO THE CREATING OF THE SECOND DATA STRUCTURE, COMPRISING PARSING A CHUNK DESCRIPTOR ASSOCIATED WITH A CHUNK OF THE FILE IN THE LOG FILESYSTEM TO IDENTIFY THE SECOND DATA STRUCTURE, IDENTIFYING ANY ACTIVE FIRST VIRTUAL MAPPING STRUCTURES THAT ARE ASSOCIATED WITH THE FILE IN THE LOG FILESYSTEM, IDENTIFYING A DEDUPLICATED BLOCK ASSOCIATED WITH THE FILE IN THE LOG FILESYSTEM, WHEREIN THE LOG FILESYSTEM IMPLEMENTS BLOCK STORAGE, UPDATING A LEAF MAPPING BLOCK OF THE FILE TO POINT TO A VIRTUAL POINTER THAT IDENTIFIES DATA ASSOCIATED WITH THE DEDUPLICATED BLOCK THAT IS STORED IN ANOTHER BLOCK OTHER THAN THE DEDUPLICATED BLOCK, BASED ON THE LOGICAL BACKPOINTER OF THE SECOND DATA STRUCTURE, AND AFTER PROCESSING ANY SECOND VIRTUAL MAPPING STRUCTURES OF THE CHUNK, FREEING THE SECOND DATA STRUCTURE 912

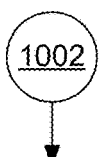

1002

BASED ON INGESTING A FILE INTO A LOG FILESYSTEM, CREATING A FIRST DATA STRUCTURE THAT INDICATES A LOCATION OF THE FILE WITHIN THE LOG FILESYSTEM, WHEREIN THE FIRST DATA STRUCTURE IS PERSISTENT FOR A DURATION OF STORAGE OF THE FILE IN THE LOG FILESYSTEM 1004

BASED ON OMITTING A DEDUPLICATION OPERATION ON THE FILE AT A TIME OF THE INGESTING, CREATING A SECOND DATA STRUCTURE THAT INDICATES THE LOCATION OF THE FILE WITHIN THE LOG FILESYSTEM, WHEREIN THE SECOND DATA STRUCTURE COMPRISES A LOGICAL BACKPOINTER TO THE FILE IN THE LOG FILESYSTEM, AND WHEREIN THE SECOND DATA STRUCTURE IS PERSISTENT AT LEAST UNTIL THE DEDUPLICATION OPERATION IS PERFORMED ON THE FILE 1006

PERFORMING THE DEDUPLICATION OPERATION SUBSEQUENT TO THE CREATING OF THE SECOND DATA STRUCTURE, COMPRISING PARSING A CHUNK DESCRIPTOR ASSOCIATED WITH A CHUNK OF THE FILE IN THE LOG FILESYSTEM TO IDENTIFY THE SECOND DATA STRUCTURE, IDENTIFYING AT LEAST ONE ACTIVE FIRST VIRTUAL MAPPING STRUCTURE THAT IS ASSOCIATED WITH THE FILE IN THE LOG FILESYSTEM, IDENTIFYING A DEDUPLICATED BLOCK ASSOCIATED WITH THE FILE IN THE LOG FILESYSTEM, WHEREIN THE LOG FILESYSTEM IMPLEMENTS BLOCK STORAGE, UPDATING A LEAF MAPPING BLOCK OF THE FILE TO POINT TO A VIRTUAL POINTER THAT IDENTIFIES DATA ASSOCIATED WITH THE DEDUPLICATED BLOCK THAT IS STORED IN ANOTHER BLOCK, BASED ON THE LOGICAL BACKPOINTER OF THE SECOND DATA STRUCTURE, AND AFTER PROCESSING AT LEAST ONE SECOND VIRTUAL MAPPING STRUCTURE OF THE CHUNK, FREEING THE SECOND DATA STRUCTURE 1008

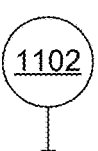

BASED ON INGESTING A FILE INTO A FILESYSTEM, CREATING A FIRST DATA STRUCTURE THAT INDICATES A LOCATION OF THE FILE WITHIN THE FILESYSTEM 1104

BASED ON REFRAINING FROM PERFORMING A DEDUPLICATION OPERATION ON THE FILE AT A TIME OF THE INGESTING, CREATING A SECOND DATA STRUCTURE THAT INDICATES THE LOCATION OF THE FILE WITHIN THE FILESYSTEM, WHEREIN THE SECOND DATA STRUCTURE COMPRISES A LOGICAL BACKPOINTER TO THE FILE IN THE FILESYSTEM, AND WHEREIN THE SECOND DATA STRUCTURE IS PERSISTENT UNTIL THE DEDUPLICATION OPERATION IS PERFORMED ON THE FILE 1106

PERFORMING THE DEDUPLICATION OPERATION SUBSEQUENT TO THE CREATING OF THE SECOND DATA STRUCTURE, COMPRISING IDENTIFYING THE SECOND DATA STRUCTURE FROM A CHUNK DESCRIPTOR ASSOCIATED WITH A CHUNK OF THE FILE IN THE FILESYSTEM, IDENTIFYING ACTIVE FIRST VIRTUAL MAPPING STRUCTURES THAT ARE ASSOCIATED WITH THE FILE IN THE FILESYSTEM, IDENTIFYING A DEDUPLICATED BLOCK ASSOCIATED WITH THE FILE IN THE FILESYSTEM, WHEREIN THE FILESYSTEM IMPLEMENTS BLOCK STORAGE, UPDATING A LEAF MAPPING BLOCK OF THE FILE TO POINT TO A VIRTUAL POINTER THAT IDENTIFIES DATA ASSOCIATED WITH THE DEDUPLICATED BLOCK THAT IS STORED IN ANOTHER BLOCK, BASED ON THE LOGICAL BACKPOINTER OF THE SECOND DATA STRUCTURE, AND AFTER PROCESSING SECOND VIRTUAL MAPPING STRUCTURES OF THE CHUNK, FREEING MEMORY ASSOCIATED WITH THE SECOND DATA STRUCTURE 1108

TEMPORARY MAPPING TO AVOID CHAIN OF VIRTUALS FOR BACKGROUND DEDUPLICATION

BACKGROUND

A computer system can store computer data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can ingest a file into a log filesystem. The system can omit a deduplication operation on the file at a time of the ingesting. The system can, based on the ingesting, create a first data structure that indicates a location of the file within the log filesystem, wherein the first data structure is persistent for a duration of the file being stored in the log filesystem. The system can, based on the omitting of the deduplication operation on the file at the time of the ingesting, create a second data structure that indicates the location of the file within the log filesystem, wherein the second data structure comprises a logical backpointer to the file in the log filesystem, and wherein the second data structure is persistent until the deduplication operation is performed on the file. The system can perform the deduplication operation subsequent to the creating of the second data structure, comprising parsing a chunk descriptor associated with a chunk of the file in the log filesystem to identify the second data structure, identifying any active first virtual mapping structures that are associated with the file in the log filesystem, identifying a deduplicated block associated with the file in the log filesystem, wherein the log filesystem implements block storage, updating a leaf mapping block of the file to point to a virtual pointer that identifies data associated with the deduplicated block that is stored in another block other than the deduplicated block, based on the logical backpointer of the second data structure, and after processing any second virtual mapping structures of the chunk, freeing the second data structure.

An example method can comprise, based on ingesting a file into a log filesystem, creating, by a system comprising at least one processor, a first data structure that indicates a location of the file within the log filesystem, wherein the first data structure is persistent for a duration of storage of the file in the log filesystem. The method can further comprise, based on omitting a deduplication operation on the file at a time of the ingesting, creating, by the system, a second data structure that indicates the location of the file within the log filesystem, wherein the second data structure comprises a logical backpointer to the file in the log filesystem, and wherein the second data structure is persistent at least until the deduplication operation is performed on the file. The method can further comprise performing the deduplication operation subsequent to the creating of the second data structure, comprising parsing, by the system, a chunk descriptor associated with a chunk of the file in the log filesystem to identify the second data structure, identifying, by the system, at least one active first virtual mapping structure that is associated with the file in the log filesystem, identifying, by the system, a deduplicated block associated with the file in the log filesystem, wherein the log filesystem implements block storage, updating, by the system, a leaf mapping block of the file to point to a virtual pointer that identifies data associated with the deduplicated block that is stored in another block, based on the logical backpointer of the second data structure, and after processing at least one second virtual mapping structure of the chunk, freeing, by the system, the second data structure.

An example non-transitory computer-readable medium can comprise instructions that, in response to execution, cause a system comprising a processor to perform operations. These operations can comprise, based on ingesting a file into a filesystem, creating a first data structure that indicates a location of the file within the filesystem. These operations can further comprise, based on refraining from performing a deduplication operation on the file at a time of the ingesting, creating a second data structure that indicates the location of the file within the filesystem, wherein the second data structure comprises a logical backpointer to the file in the filesystem, and wherein the second data structure is persistent until the deduplication operation is performed on the file. These operations can further comprise performing the deduplication operation subsequent to the creating of the second data structure, comprising identifying the second data structure from a chunk descriptor associated with a chunk of the file in the filesystem, identifying active first virtual mapping structures that are associated with the file in the filesystem, identifying a deduplicated block associated with the file in the filesystem, wherein the filesystem implements block storage, updating a leaf mapping block of the file to point to a virtual pointer that identifies data associated with the deduplicated block that is stored in another block, based on the logical backpointer of the second data structure, and after processing second virtual mapping structures of the chunk, freeing memory associated with the second data structure.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example system architecture that can facilitate temporary mapping to avoid chain of virtuals for background deduplication, in accordance with an embodiment of this disclosure;

FIG. 2 illustrates another example system architecture of uberstore components in relation to a consumer storage system (CSS) and a chunkmanager, and that can facilitate temporary mapping to avoid chain of virtuals for background deduplication, in accordance with an embodiment of this disclosure;

FIG. 9 illustrates an example process flow that can facilitate temporary mapping to avoid chain of virtuals for background deduplication, in accordance with an embodiment of this disclosure;

FIG. 10 illustrates another example process flow that can facilitate temporary mapping to avoid chain of virtuals for background deduplication, in accordance with an embodiment of this disclosure;

FIG. 11 illustrates another example process flow that can facilitate temporary mapping to avoid chain of virtuals for background deduplication, in accordance with an embodiment of this disclosure;

DETAILED DESCRIPTION

Overview

Figure 3:
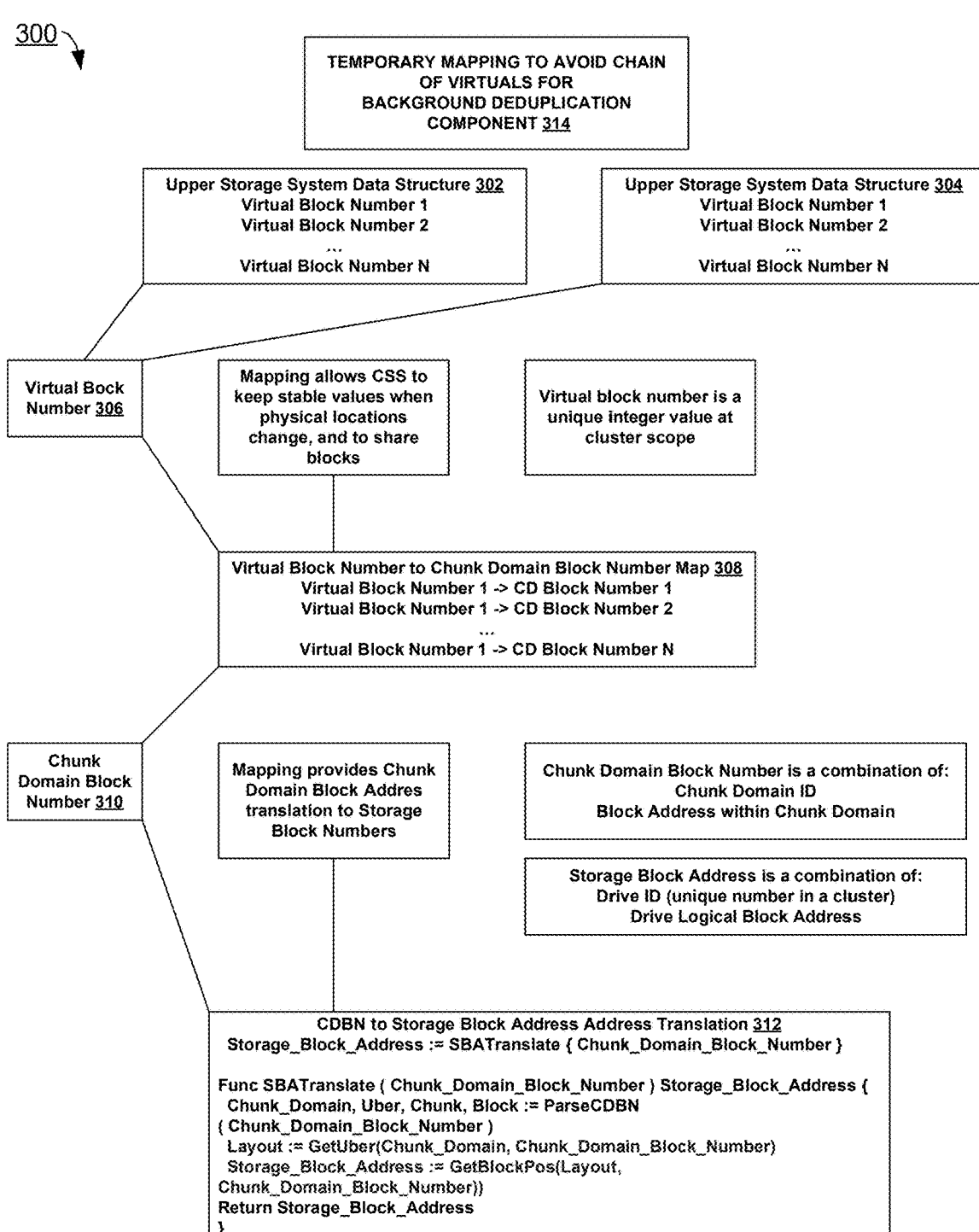
FIG. 3 illustrates another example system architecture of address translation between layers of a storage system, and that can facilitate temporary mapping to avoid chain of virtuals for background deduplication, in accordance with an embodiment of this disclosure.

Deduplication (dedup) processing, in log filesystem, can be based on deduplicating data blocks by adding a reference count on virtual object. When a similar block is identified, its virtual pointer can be stored in a dedup database (DB), then the file mapping (leaf) can be updated to point to the same virtual. This can work when dedup is done at ingest or near ingest (e.g., flush of a write back cache). However, if dedup is done post ingest (e.g., a background dedup), deduping a block, without going through an expensive and exhaustive search in the name space of the filesystem, can involve going from the chunk descriptor and identifying the chunks that contains block that are uncompressed/deduped. Then dedup/compression can be applied: the backpointers to virtuals can be used to update the mapping to a compressed block or a deduped block. For dedup, the mapping update can involve changing the existing virtual to point to another virtual that contains the same data. This creation of a "chain of virtuals" can be expensive in read latency. The present techniques can facilitate creating a mapping temporary mapping structure to enable background dedup without linking virtuals together, and avoiding going through a wide name space scan.

The present techniques can involve creating a parallel temporary structure to the virtual when data ingested, and it is not compressed/deduped. The temporary structure can be backpointed by chunk descriptors as virtual, serving as a hint that background dedup/compression needs to be done. The temporary structure can comprise information about each virtual. The temporary structure can comprise a logical backpointer to the file: snap-iD, inode, and offset of the block in the file. This structure can be temporary since it exists until background dedup is done. When background dedup is done, the present techniques can parse the chunk descriptor, and if a temporary backpointer exists, the present techniques can fetch the temporary list of structures (like a virtual chunk extent (VCE) list) and, in parallel, look for all virtuals that are still active (refcount>=1). The present techniques can then try to find a deduplicated block, and if one is found, can use the "logical file backpointer" stored in the temporary structure to update the leaf mapping block of the file to points to the virtual that has the same data. Then the old virtual can be decrefed (or freed). Once all the virtuals of a chunk are processed, the temporary structure can be freed. At the end, the file mapping points directly to the right virtual, avoiding a chain of virtuals and avoiding long latency in the read path.

The present techniques can be implemented to avoid creating a mapping structure that induces long latency after GC dedup processing in a log filesystem.

Example Architectures

FIG. 1 illustrates an example system architecture 100 that can facilitate temporary mapping to avoid chain of virtuals for background deduplication, in accordance with an embodiment of this disclosure.

System architecture 100 comprises computer system 102, communications network 104, and remote computer 106. In turn, computer system 102 comprises temporary mapping to avoid chain of virtuals for background deduplication component 108, and data storage 110.

Figure 12:
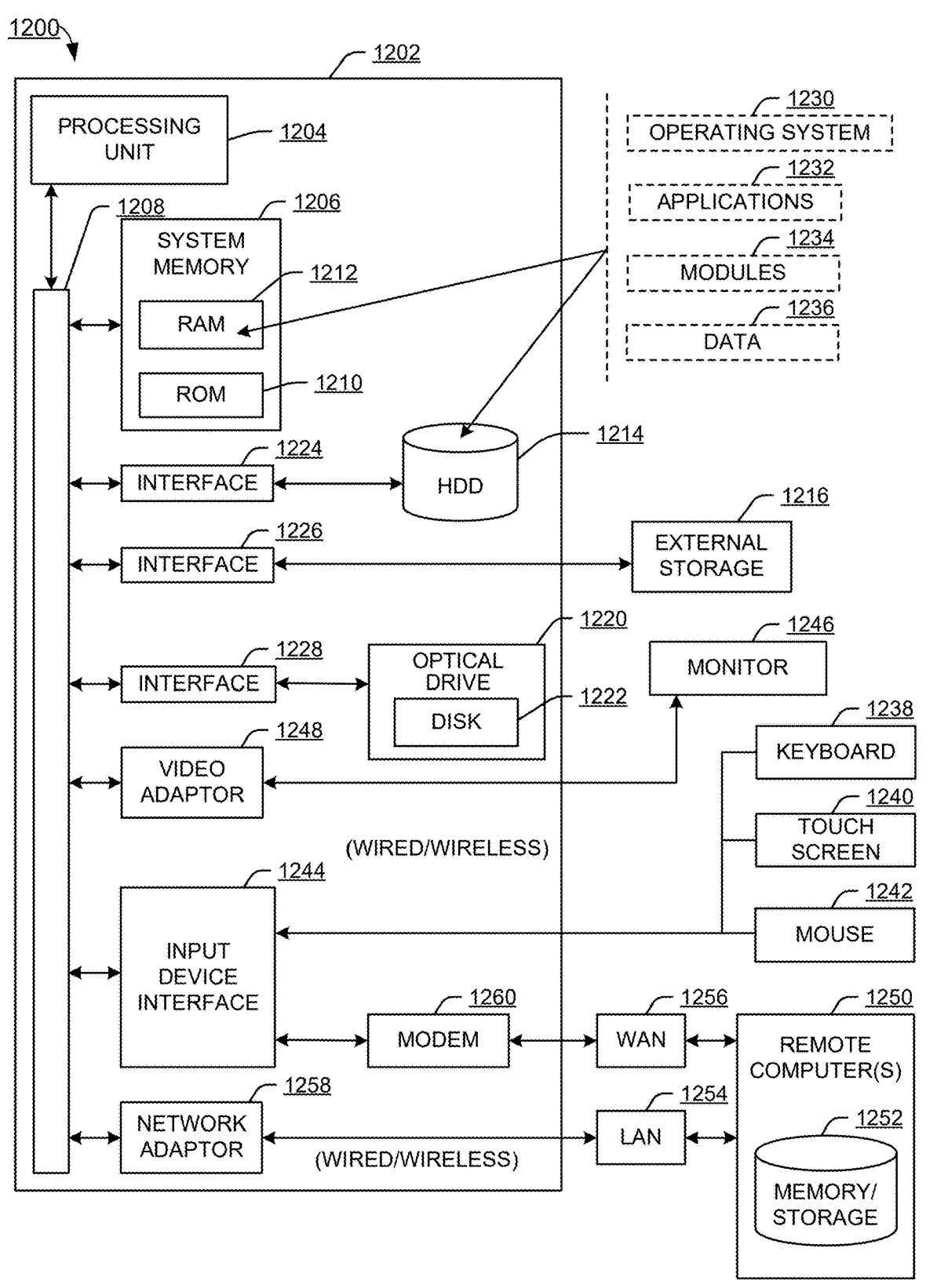
FIG. 12 illustrates an example block diagram of a computer operable to execute an embodiment of this disclosure.

Each of computer system 102 and/or remote computer 106 can be implemented with part(s) of computing environment 1200 of FIG. 12. Communications network 104 can comprise a computer communications network, such as the Internet.

Computer system 102 can store computer data in data storage 110, and make that available to read and/or write by remote computer 106 via communications network 104. As part of storing computer data in data storage 110, where deduplication is not performed on data ingest but later in the background, temporary mapping to avoid chain of virtuals for background deduplication component 108 can create a temporary mapping that corresponds to that ingested data. This temporary mapping can be used later for the background deduplication and can avoid using a chain of virtuals. After the background deduplication has been performed, then temporary mapping to avoid chain of virtuals for background deduplication component 108 can delete the temporary mapping.

In some examples, temporary mapping to avoid chain of virtuals for background deduplication component 108 can implement part(s) of the process flows of FIGS. 9-11 to implement temporary mapping to avoid chain of virtuals for background deduplication.

It can be appreciated that system architecture 100 is one example system architecture for temporary mapping to avoid chain of virtuals for background deduplication, and that there can be other system architectures that facilitate temporary mapping to avoid chain of virtuals for background deduplication.

FIG. 2 illustrates another example system architecture 200 of uberstore components in relation to a consumer storage system (CSS) and a chunkmanager, and that can facilitate temporary mapping to avoid chain of virtuals for background deduplication, in accordance with an embodiment of this disclosure. In some examples, part(s) of system architecture 200 can be used by system architecture 100 of FIG. 1 to facilitate temporary mapping to avoid chain of virtuals for background deduplication.

System architecture 200 comprises node 202A, node 202B, node 202C, CSS 204A, CSS 204B, CSS 204C, ChunkManager 206A, ChunkManager 206B, ChunkManager 206C, Uberstore Client 208A, Uberstore Client 208B, Uberstore Client 208C, ChunkStore API 210, Uberstore Client API 212, Uberstore 214, Uberstore workers 216, Uberstore metadata managers 218 (where filesystem metadata can be used to organize a filesystem, and can be differentiated from user data that a user account wants to store on the filesystem), and temporary mapping to avoid chain of virtuals for background deduplication component 220 (which can be similar to temporary mapping to avoid chain of virtuals for background deduplication component 108 of FIG. 1).

In some examples, CSS 204A, CSS 204B, and CSS 204C can generally implement functionality of data storage architecture component 220 (which is depicted logically here). System architecture 200 can generally comprise three categories of metadata: file system metadata, which is stored in ubers by the CSS and is otherwise similar to file data; chunk manager metadata, which is also stored in ubers and that is otherwise similar to file system metadata; and uberstore metadata, which can be stored in specially identifiable ubers (in some examples, it can be stored elsewhere), and that is used to store and manage the mappings of drive slices to ubers.

An Uberstore generally comprises an underlying distributed redundant array of inexpensive drives (RAID) and input/output (I/O) layer of a Common ChunkStore. The following can be a description of an Uberstore architecture. That is, an Uberstore can generally comprise an evolution of RAID technology that fits under a larger umbrella of RAID techniques, and that is sometimes called distributed RAID or mapped RAID.

A purpose of the Common ChunkStore can be to provide parity, mirror or erasure coded protected storage under a formulation of mapped RAID that controls the grouping of slices into protected sets (ubers). The upper layer storage systems can add most semantic information to the storage, whether it can be files, objects, or block volumes, and their related substructures such as directories and buckets. This upper layer storage system can be referred to as a Consumer Storage System (CSS) 204A, 204B, 204C. The CSS can also perform data reduction, such as deduplication and compression. This can be managed above the Common ChunkStore, and in some examples, the ChunkStore can play a part in data reduction. An objective can be to achieve a major commonality objective in a portion of the storage system data path where there can be overlapping functionality across the platforms by building a high performing, scalable and reliable data reliability platform.

As used herein, RAID can indicate that drives are partitioned into slices, and the slices are grouped into ubers, where each uber intersects some but not necessarily all of the drives, and where each drive is fully protected by a combination of some but not all of the ubers in the system. This can be viewed in contrast to an array of drives where each stripe intersects all drives.

Functionality of the Common ChunkStore can be divided into different modules and layers. The lowest layer can be the Uberstore 214, which comprises four different multi-instance modules, the Uberstore worker, the Uberstore Metadata Manager, and the Uberstore Client (e.g., Uberstore Client 208A) that runs on each node (e.g., node 202A) and links to the ChunkManager (e.g., ChunkManager 206A) and the CSS (e.g., CSS 204A). The Uberstore client also can be linked to a fourth component, the Device Gateway Initiator, which can provide direct I/O access to drives throughout the storage cluster via the network. The Uberstore can be responsible for providing distributed RAID. A purpose of the Uberstore can be to store data and metadata on behalf of the CSS and the ChunkManager, and to protect that data and metadata against loss, corruption, or unavailability by applying an erasure code to it (e.g., parity or mirroring).

An Uberstore 214 can have several responsibilities:

Allocation of space on drives to form distributed RAID groups, called ubers. Ubers can comprise an allocation of space across multiple drives to provide room for chuklets.

Adding parity information to data written by the ChunkStore client via the ChunkManager.

Understanding the state of the drives in the cluster and performing repair actions at the RAID level.

Data and parity scrubbing as a background operation. It can perform this in conjunction with the ChunkManager, which can hold per chunk metadata used in the scrub.

Maintaining accurate cached information at the Uberstore clients and Uberstore workers 216 about the layout of ubers on drives, enabling direct read and write I/O from upper layers to the drives.

Coordinating the ability of ChunkManager clients in the cluster to write ubers at full stripe (data chunk plus parity) granularity.

Coordinating the garbage collection of ubers to deallocate space back to the drives.

"Disk Tango" operations, such as moving a drive from one enclosure or node (e.g., node 202A) to another, either singly or in groups, without losing the majority of the data on the drives. An intent with this approach can be to avoid rebuild when replacing the hardware component (shelf or enclosure) that holds some drives.

Ability to add or remove drives from a drive pool.

Supporting both discrete node (e.g., node 202A) (drives in the nodes) and disaggregated (drives in separate enclosures on the network) configurations.

There can be boundary conditions based on physical requirements to match the underlying storage devices and media, and logical requirements to match the needs of the consuming system.

The following terms can be used:

Drive Pool: The storage devices in the cluster can be grouped into one or more drive pools. This can be based on the characteristics of the drives. Drives in a drive pool can have similar internal geometry, performance, special functionality such as flexible data placement, computational capabilities such as self-encryption, and wear budget. Within a drive pool, space allocation can be performed in constant sized units called slices; the size of slices can be set for each drive pool as a whole, and can vary between different drive pools. An Uberstore 214 can support both solid state drives (SSDs) and hard disk drives (HDD); SSDs and HDDs can be in different drive pools.

Storage Provider Pools: Drive pools can be a special case of storage provider pools. Other storage capacity can be attached to or accessible from a storage cluster, including block storage servers, cloud storage, object storage, or other online media or data storage services. Some of these classes of storage can provide their own physical protection of stored data. The focus of Uberstore 214 can be on managed drive pools where the Uberstore provides the physical protection for the upper layers. Cloud storage, external block storage, and external object storage can be consumed by implementing the same application programming interface (API) as Uberstore. It can be that an Uberstore should be responsive to read requests in a timely way regardless of where the data has been placed in Uberstore-managed storage. The present examples can generally relate to a scenario where the storage provider can be a Drive Pool that can be internal to the cluster.

Inclusion Group: The drives in a drive pool can be grouped into one or more inclusion groups. The purpose of an inclusion group can be to confine RAID groups (see uber below) to an inclusion group. Inclusion groups can be defined hierarchically, that is, the members of a group can be either drives or inclusion groups (but not both at the same time). This can enable support for two or more tiers of RAID protection. In some examples that do not implement inclusion groups, Drive Pools can be used as the outer boundary for the single layer of RAID supported by the first releases of Uberstore 214.

Exclusion Group: The drives in a drive pool can be grouped into one or more exclusion groups. The purpose of an exclusion group can be that, within an exclusion group, no more than a specified number of drives can be used within the same RAID group (see uber, below). This can be similar to a fault domain.

Block: A block can be the smallest unit of read I/O allowed to stored data in Uberstore 214. For Uberstore, a block size of 512 B can be maintained, where this matches a minimum block size exposed by drives. The block can be exposed at the Uberstore interface as a unit of aligned read I/O. Blocks in Uberstore can be individually addressable by their Chunk Domain Block Number. Logically adjacent blocks can have Chunk Domain Block Numbers that differ by one. In some examples, these blocks can be physically adjacent on the storage media. At the upper interface of the ChunkStore, exposed by the ChunkManager (e.g., Chunk-Manager 206A) to the CSS (e.g., CSS 204A), the CSS can read and write blocks of any size supported by the Chunk-Manager API. The ChunkManager can repackage those blocks via compression and deduplication, ultimately composing multiple CSS blocks into a chunk to write to the Uberstore write API. This chunk can later be retrieved at 512B granularity. It can be that there need not be a direct correlation between CSS blocks that are written to Chunk-Store, and storage level blocks stored by the Uberstore as addressable parts of chunks.

A scale-out network attached storage (NAS) can use a filesystem block size of 8 kibibytes (KiB). A scale-out NAS can have a minimum read size of 8 KiB for data, and less for metadata and journal I/O. A ChunkManager can translate read requests to scale-out NAS blocks to a read of a number of 512 B Uberstore blocks that collectively contain the targeted data, which can be possibly compressed and/or deduplicated. Uberstore can be unaware of any data reduction that has occurred on data stored in Uberstore, and can be also unaware of filesystem block sizes and alignments; this can be a function provided by ChunkManager which can be aware of the filesystem block size and alignment and also of compression, but can be not aware of upper layer structures such as files.

Indirection Unit: The actual write unit to SSD media can be an Indirection Unit, which can be 4 KiB in some examples, and can be increased to larger powers of two in larger drives (e.g., >16 terabyte (TB) drives). An aspect of Common ChunkStore can be that the minimum write size for RAID protected storage can be a strip, which can be larger than the minimum read size for RAID protected ubers, facilitating using storage devices with large indirection unit (IU) sizes efficiently, where an IU can affect an internal remapping granularity of a storage device. Writing less than an indirection unit of data to an SSD, or at unaligned SSD logical block addresses (LBAs), can result in read-modify-write operations on the drives, which can reduce performance, increase write amplification inside the drive, and increase wear and power consumption.

Sector: The actual read and write unit to HDD media can be a sector, which can be 512 B (or 520 B in some cases). HDDs can continue to support a sector size of 512 B, and can emulate that small sector size by performing read-modify-write operations on larger 4 KiB sectors on disk.

Chunk: The chunk can be the smallest unit of write I/O allowed to store data in the Uberstore. The Chunk size can be fixed within a Chunk Domain, and can vary between different Chunk Domains in the same cluster and drive pool; it can be an outcome of the geometry (aka shape) of the Ubers in the Chunk Domain. Each chunk can be an integer number of 512 B Blocks. The chunk can be a full RAID stripe including either data and parity or mirrored copies of data. It can be that Chunk Domains can only be written in chunks, which are written to a chunk address within the Chunk Domain that can be provided by the ChunkStore. Chunk addresses can be block addresses within the Chunk Domain that align to chunk boundaries. Writing only in full stripes (each stripe can comprise a chunk of data plus additional mirror or parity strips) can simplify the operation of the RAID layer in Common ChunkStore. In-place updates of chunks can be prohibited—that is, it can be that chunks cannot be overwritten until they are first deleted; once they are written they can only be read or deleted. In some examples, a ChunkManager (e.g., ChunkManager 206A) can perform only forward copy—that is, it can completely evacuate ubers rather than overwriting previously written and deleted chunks. It can be that, whether or not Chunk-Manager recycles individual chunks is not apparent to Uberstore other than it changes uber utilization, which can be maintained by ChunkManager. This can simplify the operation of the Uberstore as it can be that Uberstore does not have to be concerned with locks and races in accessing the stored chunks. Chunk sizes can be variable within the cluster, but fixed within a given Chunk Domain.

Chunk Domain: The Chunk Domain can be a set of blocks, each identified by a Chunk Domain Block Number (CDBM), which can be a relative block address from the beginning of the Chunk Domain [0 . . . . N]. Same-size groups of consecutively numbered blocks in the same Chunk Domain partition can be grouped into chunks, and chunks can be identified by their lowest CDBN. A cluster can have many Chunk Domains. Chunk Domains can each uniquely serve some function for the CSS (e.g., CSS 204A) or for ChunkManager, for example, data ingest, long-term data storage, CSS metadata storage, etc. Some Chunk Domains can serve internal purposes, such as metadata storage for the ChunkManager. The Uberstore 214 can also store its own metadata in its own managed drive areas; it can be that this data can be never consumed or seen directly by any upper layers. These drive regions can be on local devices and can be partitions of drives that otherwise store ChunkStore data, or on entirely separate drives. Data and metadata that the Uberstore stores on behalf of upper layers can be stored in ubers that are components of a Chunk Domain. Uberstore metadata can be stored in back end volumes (BEVs), without the additional abstraction of Chunk Domains. The Chunk Domain can comprise an integer number of chunks. Each Chunk Domain can be accessible cluster wide. Each Chunk Domain can be confined to a single drive pool. The drive pool can be utilized to construct multiple Chunk Domains with different characteristics, including different RAID shapes. A constant for a drive pool can be that slice size can be constant within the drive pool. The Chunk Domain can be analogous to a block volume, with the following differences:

It can be only writable in chunks, at chunk aligned boundaries, not arbitrary blocks, at the Uberstore Client API 212. It can be readable as 512 B aligned and sized blocks.

It cannot be accessed via block protocols. It can be accessed via the Uberstore Client API.

It can be that CSS blocks are not necessarily preserved as Uberstore blocks, or even aligned to the same boundaries. Generally, the ChunkManager can keep CSS blocks intact when packing them into chunks, but CSS blocks can straddle Uberstore block boundaries.

The Uberstore write API can accept a Chunk of data (which can be, e.g., user data, CSS metadata, or Chunk-Manager metadata) with a specified chunk address. If the chunk address can be valid, that is, if the chunk can be available for that ChunkManager to write and the chunk has not been previously written (it can be that only the one ChunkManager client has write privilege for a chunk; write privilege can be by definition write-once), then the Uberstore Client (e.g., Uberstore Client 208A) can divide the chunk into strips, compute and insert parity strips as needed, and write out the chunk plus parity as a Full Stripe Write to

| Subsystem Layer | Object Mapping Between Layers | | | | | | |
|---|---|---|---|---|---|---|---|
| CSS (Client Storage System) | Chunk Domain | N/A | N/A | N/A | | Block | |
| ChunkManager | Chunk Domain | N/A | Group of chunks (data portion only) | N/A | Chunk (data portion of a stripe) | N/A (or Chunklet) | Block (Data only) |
| Uberstore | Backend Volume Group | Back-end Volume (Data and parity or mirrors) | Uber Group | Uber Slice | Stripe (includes data and parity or mirrors) | Strip (parity and/or data) | Block |

Clients in the Client Storage System can be aware of Chunk Domains, which they write data to and read data from, and blocks, which can be the granularity of read and write I/O to the ChunkStore.

The ChunkManager (e.g., ChunkManager 206A) can be an intermediary between the CSS (e.g., CSS 204A) and the Uberstore 214. It can perform data manipulations such as deduplication and compression, which can transform the presented blocks on the way to and from the underlying storage in Uberstore. For example, it can perform deep data reduction operations such as larger compression granularity, and deeper deduplication. This can be done in conjunction with data tiering operations, which can also be performed by ChunkManager. For scale-out RAID, it can be that the CSS can handle ingest of data and perform block granular compression. The ChunkManager can later recompress the data blocks in larger groups, for example during forward (garbage) collection to reclaim more space. This can be all above the Uberstore, which can play no role in compression or deduplication of data.

Therefore, the ChunkManager interface can take data to write as blocks or lists of blocks. It can then pack and prepare the data into chunks. Chunks can be fixed sized aggregations of data, CSS metadata, CSS journal, or Chunk-Manager metadata. It can be common to separate chunks into different categories depending on use case, reliability and performance requirements. Packing and preparing can include deduplication and compression of the data. This can be all ChunkManager functionality. Uberstore can encrypt data for storage at the granularity of entire chunks (see below). The chunks can be written in their entirety to a Chunk Domain target by the ChunkManager, to a specified Chunk address in the Chunk Domain.

the targeted storage devices. The full stripe can be a collection of data and parity blocks which can be written to different drive slices in the cluster. Or it can be multiple mirrored copies of the data.

Generally, Uberstore can support full chunk writes at large granularity chunk size (e.g., 2 MiB) with inserted parity or erasure coding information added. Parity can be XOR (e.g., RAID5, EvenOdd, or row-diagonal parity (RDP) RAID6), Reed Solomon (RAID6), or others. This can provide a data write mechanism that can be suitable for log-style writers common across most modern storage systems. Systematic codes can be preferred as maximum distance separable (MDS) codes. Reed Solomon can be an erasure code used for log data. For write-in-place data, as well as for low-latency logs such as journals, 3× mirroring can be used. Here the chunk size can be one CSS block, which can be 8 KiB for data, and as small as 512 B for journals and metadata. Similarly, the ChunkManager itself can use its own internal Chunk Domains for its own metadata and these can likely also be mirrored with a small chunk size to support write-in-place as well as journaled I/O styles.

The write I/O interface provided by Uberstore 214 can accept Chunk-sized writes as appropriate for the Chunk Domain being written. It can reject writes that are the wrong size for the Chunk Domain being written (and for its underlying ubers). Chunk Domains can co-exist in the same drive pool and use the same slice size for drive space allocation as other Chunk Domains in the same drive pool, while they can have different uber sizes and different RAID formulations. This can be referred to as an uber's "shape."

The Uberstore can provide a granular interface for reading data. It can return data from chunks at block granularity.

Block size for Uberstore can be universally set to 512 B, regardless of the block size(s) used by the CSS (e.g., CSS 204A) above or the drives below. It can be that, for the vast majority of writes, the write size (equal to the strip size) can be greater than or equal to the IU size of the drive, eliminating the increase in write amplification that results from read-modify-write in large IUs.

On read, Uberstore generally can retrieve only the data strips (or portions of data strips) being read from the drive slices that compose the uber. Then it can return the requested blocks to the ChunkManager. This can be a contiguous string of consecutive blocks, or a scatter-gather list of blocks to be loaded into addresses provided by the ChunkManager via the Uberstore Read API. Data read from Uberstore can be likely to have been compressed by the CSS or Chunk-Manager; it can be that it is not the Uberstore's responsibility to decompress the data. As a result, it can be that block alignment between CSS blocks and Uberstore blocks on drives can be not assured, or even not likely. Uberstore can also perform a verify read operation, which can force reconstruction of the specified block(s) from stripe parity. Generally multiple such reconstructions can be possible for a stripe, for example from both P and Q parity for a single block reconstruction. This can be used by the ChunkManager to force reconstruction of blocks when their content does not match expected values.

Similarly, the ChunkManager can have encrypted data. Uberstore can be unaware of any encryption and does not manage keys. ChunkManager can also directly consume its own metadata from its own Chunk Domains.

Uberstore can be built using a distributed RAID layer. Uberstore can support direct I/O from CSS client nodes to local or network attached devices for both the read and write path. To make this possible, each node (e.g., node 202A) can have an Uberstore client library that performs the chunk and block granular I/Os, along with parity construction, degraded read reconstruction and any other RAID operations. Each node's Uberstore client stack can link, or can send messages, to a Device Gateway Initiator, which can access a Non-Volatile Memory Express (NVME) reachable drive in the cluster.

Each node (e.g., node 202A) can maintain a local cache of uber layouts for recent and current ubers. For writable ubers, this can contain additional information, such as Reclaim Unit Handles for the slices of the open (for writing) ubers. Since flexible data placement (FDP) drives can have a limited supply of reclaim unit handles (RUHs) (e.g., 8, or at most 16, in some FDP enabled drives), it can be a requirement on Uberstore to manage the limited supply of handles.

| | | | Terminology Mapping | |
|---|---|---|---|---|
| Common ChunkStore | Con- taining Object | NAS Storage | Software Defined Infrastructure | Function |
| Uberstore worker | 1 per node | none | PDS (portion of function) | The Uberstore worker can be the context for execution of one or more uber/uberlet DBs |
| Uberstore client | 1 per node | Some similarity to a block allocation manager (BAM) and a remote block manager (RBM). | Uber/uberlet DB (shift of I/O function to client node) | The Uberstore client performs direct I/O to drives on behalf of ChunkStore client storage systems. It maintains a cache of uber layouts. It also can be responsible for adding parity or mirroring to written chunks to form full stripes. It also reconstructs missing blocks on the fly during degraded reads (although it can be that it is not expected to repair those blocks) |
| Uber | Uber Group | none | Uber | Mapped RAID group. Each uber contains a set of sequentially numbered, logically contiguous chunks in the same Chunk Domain, plus their parity or mirrored blocks. |
| Slice (or uberlet) | Uber | none | slice | Single drive contribution to an uber. |
| Chunk (could be the data-containing portion of a stripe in an Uber) | Chunk Domain | none | Log (in Logical Layer) | Individually writable collection of logically-contiguous blocks of fixed size to a Chunk Domain (they may or may not be physically contiguous depending on where the logical numbering crosses slice boundaries). |
| Stripe | Uber | none | Stripe (in Physical Layer) | A complete RAID stripe of strips that holds exactly one chunk of data. |
| Strip | Stripe | — | Strip | Portion of a stripe that resides in one slice. It can contain data and/or parity/mirror blocks, depending on the RAID encoding. |
| Chunk Domain | Drive Pool | none | None. Scoped and virtualized like a Storage Pool, but physically addressable. | Block addressable collection of chunks. Distributed management across multiple uber/uberlet DBs, which are distributed across the Uberstore workers. |
| Exclusion Group | Drive Pool | Fault domain | Fault Set | Collection of storage devices (e.g. drives) that are limited with respect |

-continued

| Terminology Mapping | | | | |
| --- | --- | --- | --- | --- |
| Common ChunkStore | Con-taining Object | NAS Storage | Software Defined Infrastructure | Function |
| | | | | to their membership in individual ubers. For an exclusion group, no more than n slices can come from the same exclusion group in any uber. |
| Inclusion Group | Drive Pool | Drive Pool | Device Group | Collection of storage devices or other inclusion groups which ubers are limited to. For any uber, it can be that all its slices must come from one inclusion group. |
| Drive Pool | Cluster | Drive Pool (no hierarchy) | Device Group | Collection of similar drives. |
| none | none | none | Storage Pool | Pool of reserved space in a device group that has a defined RAID level. Some similarity to Chunk Domain, but not internally addressable. |
| Uber Group | none | none | none | In some examples, an Uber Group can be made of collection of contiguous Chunks. In other examples, an Uber Group can be made of discontinuous UBERs (up to UberStore), where the same Reclaim Unit Handle for a storage drive is used to write to those Ubers. A Reclaim Unit Handle can generally comprise a handle to a storage device that facilitates orderly future garbage collection on the device. |

Since Chunk Domains can be cluster-scoped entities, there can be a small number of Chunk Domains, relatively independent of the size of the cluster. Different Chunk Domains can be required to separate data by protection level (e.g., 8+2 RAID vs 16+3 RAID), by media type (e.g., triple-level cell (TLC) vs. quad-level cell (QLC)), and/or by type of data (hot vs. cold, metadata vs. user data).

The chunks can be small enough that buffering enough data to put in a chunk can be done without frequently forcing the CSS (e.g., CSS 204A) to persist the data separately. The chunks can be large enough that a reasonably wide full stripe whose strips are at least one drive IU in size can be formed for efficient writing. For scale-out RAID, this amount of data can be about 2 mebibytes (MiB). The chunk can be striped across many drives (e.g., 8 or 16, and other values can be supported). This can lead to a strip size of 256 kiB or 128 kiB (for 8- and 16-way striping respectively at a 2 MiB chunk size). This can facilitate writing at least one drive level IU-SSDs can manage the alignment to avoid fragmenting writes. For wider chunks (e.g., 64+4), the chunk data size can be made a multiple of the maximum IU size in the drive pool, e.g., 64×256 kiB=16 MiB. It can be that larger chunks involve writing more data in a single operation. This can be useful when staging the data into a high-performance tier, then later destaging it to a colder tier for longer term storage, where optimization for RAID capacity efficiency can be performed.

Uber: Consecutive chunks in a Chunk Domain can be grouped into ubers. Ubers can be fixed size within a Chunk Domain, and can be of different sizes between Chunk Domains. Therefore, within a Chunk Domain, the ubers can have the same number of chunks and the same number of blocks. Ubers can be constructed from a collection of slices, each of which can contain either data or parity (or some encoding of both), and each of which can contain one independent portion of the uber that can be stored on one drive. It can be that each slice must be on a different drive from the same drive pool; other restrictions on slice placement can also be enforced by the Uberstore to ensure proper isolation of different failures. Within a drive pool, all slices can be of the same size. This can facilitate allocation of slices to different Chunk Domains with different RAID parameters from the same drive pool. The slice can be the amount of consecutively numbered drive space allocated to the uber on each drive. In an example, with strips of 256 KiB and 4 k chunks per uber, the slice size can be 1 GiB.

It can be that ubers can contain many fewer slices than there are drives in the pool. The "width" of the uber (the number of slices in it) can be defined by the Chunk Domain that the uber is assigned to. A Chunk Domain can be similar to a block volume in this respect; it can be a linearly addressed range of blocks, where consecutively numbered groups of data blocks with added parity are called chunks, and consecutively numbered groups of chunks form ubers. Each uber can be composed of n data and m parity or mirroring slices. Each uber can be striped into chunks, where each chunk can be composed of strips, and each strip can be the portion of a stripe that resides on one slice. The strip can be sized to match the largest IU size that is expected to be encountered for the next several drive generations (it can be made bigger at that time). This can be 128 kB or 256 kB, in some examples. The chunk size can vary depending on the width of the uber. So, for a given drive pool, slice size and strip size can be fixed, and for a given Chunk Domain, uber size and chunk size can be fixed. Different Chunk Domains can be allocated from the same drive pool, and these can have different RAID structure, therefore different uber and chunk sizes, but can have the same slice sizes as each other.

An uber can be sized to be several GiB of readable data, plus additional space for parity or mirrored blocks. For example, with 2 MiB chunks, 4,000 consecutive chunks can be grouped into an uber, giving an uber size of 8GiB. Uber sizes, like chunk sizes, can vary between Chunk Domains.

The purpose of the uber can be two-fold:

The uber grouping of chunks can be used to reduce the metadata footprint of the Common ChunkStore to track the layout of RAID groups mapped to drives. It can also reduce the workload involved to allocate drives into chunks, by a factor of 4 k times in the example above.

An uber can be used as a unit of write space allocation to individual nodes in the cluster. That is, in a scaleout storage system, each node (e.g., node 202A) can get exclusive write access to an uber from each Chunk Domain it wishes to write to. Using ubers for this can simplify both the allocation of this space to writers and the management of the space in the common Chunk-Store.

Ubers can comprise relatively large amounts of data space; typical Uber size can be on the order of 8 GiB. In a large cluster, with each node (e.g., node 202A) writing, this can result in a total pre-commitment of writable space to nodes on the order of small TBs. In an example with an average of pre-committed but unused space per node of 0.5 uber, this can comprise pre-committing on average several GB per node. This can be a small fraction of the total usable space in the cluster, as total storage capacity can be many TBs per node.

Each chunk can be striped across an entire uber and can be divided into strips where a strip can be the portion of a chunk (data or parity) that resides in one of the slices. Chunks can be uniformly striped across the slices, as if the slices were each a tiny disk drive. If there are n chunks in an uber, then there can be n strips in each slice in the uber, and they can all be in the same order in each slice. The location of the parity strips in each chunk relative to the data strips can vary to allow rotated parity, which can give a balance of read I/O across the drives.

In some examples, CSS (e.g., CSS 204A) can read any block stored in any Chunk Domain in ChunkStore at the scope of the cluster. Access of some CSS entities can be restricted to some Chunk Domains in the future to support multiple CSSs sharing the same Uberstore infrastructure. It can be that no restrictions can be imposed unless system-level multi-tenancy is implemented. The CSS can write chunks to any Chunk Domain in the ChunkStore at the scope of the cluster, but with restrictions. In some examples, the CSS must negotiate with the Uberstore via the ChunkStore API 210 to get a set of writable chunks, which it can have exclusive permission to write. The granularity of this allocation can generally be in entire ubers. The CSS can be unaware of ubers, and only deals with chunks for writing and blocks for reading ChunkStore Physical Block Addresses. The term Physical Block Address can be used for the block addresses within a Chunk Domain. There can be another layer of mapping in Uberstore to resolve a Chunk Domain Physical Block Address (which can be referred to as a CDBN) to a drive Logical Block Address (LBA), which in turn can be mapped internally to the drive by a Flash Translation Layer (FTL) to an actual position in media.

The interface between the CSS and the Uberstore 214 can be via the ChunkManager (e.g., ChunkManager 206A). The ChunkManager can perform a mapping from virtual block numbers, which can be stored in CSS data structures such as filesystem inode mapping trees (which can be inode format manager (IFM) trees; an inode can comprise a data structure that describes a file or a directory in a filesystem. Each inode can store attributes and disk block locations of the object's data), to Chunk Domain Block Numbers (CDBNs) via a virtual to physical block number map. The ChunkManager or CSS can perform data reduction including deduplication and compression. It can be that the Uberstore is not involved in data reduction. On write, ChunkManager can be supplied with full chunks that can be ready to be RAID protected and turned into full stripes by Uberstore. The mapping of logical block numbers within the CSS to virtual block numbers can be entirely managed by the CSS and can be outside the scope or awareness of the Uberstore. In some examples, each virtual block number can usually reference one 8 KiB data or metadata block; it can also reference a 512 B software journal block. The assigned virtual block numbers can be sparse or dense in virtual block number space-virtual block numbers can be similar to keys that return a value (a logical Chunk Domain Block Number). The virtual address map can be a ChunkManager structure; the Uberstore can be unaware of virtual block numbers. The Chunk Domain Block Number (CDBN) can be the block numbering within a single Chunk Domain; it can be zero-based. Chunk Domains can be cluster-scoped and have distributed management across many uber/uberlet DBs. A ChunkManager can be unaware of ubers, uber groups, and uber/uberlet DBs, although its interactions with Uberstore can be optimized with hints that relate to the underlying construction of the Chunk Domains.

There can be one more mapping to translate the CDBN into a Storage Block Address (SBA). The storage block address can be a direct reference to a single drive block within a single drive namespace. While a common Chunk-Store can be further layered on some other external block storage provider that might provide protection, it can be that a common case is that the SBA resolves to a block in a physical media device, such as an NVMe SSD or HDD. In SSDs, the drive LBA can undergo an additional mapping within the drive Flash Translation Layer (FTL) before finally resolving to a physical location on the media. A Chunk Domain Block Number can be the combination of:

A Chunk Domain identifier; and

A block address (block size can be a multiple of 512 B, to match minimum device level block sizes) in the Chunk Domain.

| Virtual Block Number | Virtual to Chunk Domain Mapper | Chunk Domain Block Number | Storage Block Address |
|---|---|---|---|
| Stored in CSS data structures References a unique block in the ChunkStore | Maps each unique virtual block number to a single block address in a | Chunk Domain Block Numbers identify a Chunk Domain, and a block position within the Chunk Domain. The block position can be directly | A storage block can be identified by a Drive ID in a cluster, and a |

-continued

| Virtual Block Number | Virtual to Chunk Domain Mapper | Chunk Domain Block Number | Storage Block Address |
|---|---|---|---|
| There can be multiple references to the same virtual block from different metadata structures (e.g. inodes, logical unit number (LUN) block lists) in the CSS | Chunk Domain. Chunk Domain Block Numbers are unique cluster-wide. Virtual block number (VBN) to CDBN maps are distributed across the cluster; the VBN key can determine which map shard to use for lookup. | convertible into uber number, chunk index within uber, strip number within chunk and block number within a strip. This can be translated with a minimum of computation and metadata lookup into a Storage Block Address. | Logical Block Address on that drive. |
| CSS_Data_Structure. VirtualBlockNumber_ x → (map in CSS) This mapping can be done outside the Uberstore. The interface to the Uberstore takes a Chunk Domain Logical Block Address as an argument. | Chunk_Domain Block_Address → (translate) | Chunk_Domain, Uber, Chunk, Block → (lookup Uber Layout) Chunk_Domain = Extract_Chunk_Domain (Chunk_Domain_Block_ Address) Chunk_Domain_info = Lookup_Chunk_Domain (Chunk_Domain ) UberNum, Block_in_uber = Calculate_Uber_Number (Chunk_Domain_info, Chunk_ Domain_Block_Address) Uber_Layout = Uber_Lookup(UberNum) DriveID, Drive_LBA = Calculate_Block_Position (Uber_Layout, Block_in_uber) | Drive, Drive_LBA |

FIG. 3 illustrates another example system architecture 300 of address translation between layers of a storage system, and that can facilitate temporary mapping to avoid chain of virtuals for background deduplication, in accordance with an embodiment of this disclosure. In some examples, part(s) of system architecture 300 can be used by system architecture 100 of FIG. 1 to facilitate temporary mapping to avoid chain of virtuals for background deduplication.

System architecture 300 comprises upper storage system data structure 302, upper storage system data structure 304, virtual block number 306, virtual block number to chunk domain block number map 308, chunk domain block number 310, CDBN to storage block address address translation 312, and temporary mapping to avoid chain of virtuals for background deduplication component 314 (which can be similar to temporary mapping to avoid chain of virtuals for background deduplication component 108 of FIG. 1).

Each Chunk Domain can have a defined chunk size, strip size, uber size and RAID layout. Strip size can be limited by RAID layout and by the characteristics of the drives in the drive pool. Slice size can be fixed in the drive pool to simplify raw storage space allocation. The Chunk Domain can be limited to a drive pool. The Chunk Domain Block Number 310 can specify the Chunk Domain as a 12 b field.

Chunks can consume more raw storage space than their data size due to the inclusion of parity or mirroring blocks in the chunk along with the data. Within a Chunk Domain, there can be a common uber format, including a common RAID layout. An example Uber layout can be RAID-6 8+2 rotating parity layout containing 8 data strips and 2 parity strips per chunk—this can be referred to as an 8+2 layout.

Different Chunk Domains can have different chunk sizes, and different uber layouts (it can be that, within a drive pool, all slices must be the same size for uniform and simple allocation of drive LBA space). Chunk Domain numbering can be arbitrary up to the limits of the field containing the Chunk Domain ID; it can be that Chunk Domains must be uniquely numbered in the cluster but are not required to be sequentially allocated. The Chunk Domain id can be a fixed field found at the start of a Chunk Domain Block Number. It can be that there are a relatively small number of Chunk Domains in a cluster, so Chunk Domain ID can be a small number, e.g., 12 bits, which can be packed as the high order bits field in a Chunk Domain Block Number.

If an uber/uberlet DB fails, a backup uber/uberlet DB can be designated by Uberstore to handle the operations. The uber/uberlet DB can be an active element in the failure-free data path. In Uberstore, since direct I/O can be enabled by Uberstore clients, it can be the Mus are not in the data path for normal case I/Os (read or write) and are responsible primarily for managing caches of Uber layouts at the Uberstore clients. In this case, the uber/uberlet DB can act as a layout caching intermediary between the Uberstore client and the MDM. This extra complexity can be intended to reduce the load on the MDM for routine uber layout lookups for read operations. A simpler alternative architecture and implementation can be to have each Uberstore client talk directly with the MDM to get uber layouts. This can be a simpler approach, and can reduce the role of the uber/uberlet DB to execution of Uber level operations such as repair and rebalancing at the instruction of the MDM. It can be that the uber/uberlet DB on its own cannot perform forward collection (space reclaim, that is, garbage collection, restriping, tiering or rekeying). Therefore, the uber/uberlet DB can perform direct drive I/O. The MDM can be the manager of all repair operations, while the uber/uberlet DBs perform the repairs. For any individual drive failure, this allows for mesh rebuild, with different uber/uberlet DBs on different nodes performing repairs at uber granularity. The uber/uberlet DB can be a context (such as including a thread) in an Uber Worker.

The following is an example breakdown of a 64 b Chunk Domain Block Number.

| Bits | Value | Quantities |
|---|---|---|
| 63-60 | Reserved | 4 reserved bits |
| 59-52 | Chunk Domain ID | Up to 256 Chunk Domains per cluster |
| 51-48 | Reserved | 4 reserved bits |
| 47-40 | Chunk Domain Segment ID | Up to 256 segments per Chunk Domain |
| 39-0 | Block Number in Segment | 4Ti of 512B blocks = 2PiB per segment addressable space |

8 bits are dedicated for Chunk Domain ID, leaving some reserved bits for future expansion of those fields, introduction of other fields or expansion of the Block Number field. This can limit the number of uber/uberlet DBs that can be assigned to a Chunk Domain to 256. The total number of uber/uberlet DBs in the cluster can be larger; this can be a parameter determined by the Uberstore implementation and deployment.

The CSS can store virtual block numbers (e.g., virtual block number 306) in its data structures that reference stored data or metadata. CSS virtual block addressing can be done via a globally unique virtual block number (VBN), which can be a large globally unique key. There can be different approaches to assigning the virtual keys. In some examples, virtual keys are uniquely assigned serial numbers scoped by uber/uberlet DB. In some examples, the virtual block number can be actually a block address within a special Metadata Chunk Domain that contains only virtual to physical mapping structures. In some examples, there can be one Virtual Block Pointer Chunk Domain per cluster. The metadata block structure of the virtual Chunk Domain can fit into one 512 B block and can generally contain many virtual block pointers (up to 32, in some examples). This can give a total addressability of 256 tebibytes (Ti) of virtual structures, referencing between 1 and 32 CSS blocks each. If, for example, CSS blocks are 8 kB, this can give a maximum capacity of greater than 73 exabytes (EB) of protected capacity usable by the CSS and for chunkmanager metadata. The virtual block pointers can survive restriping and tiering operations. Therefore, it can be that they are not divided into different Chunk Domains. This design can be similar to some examples that allocate virtual block numbers sequentially within the scope of each uber/uberlet DB. These virtual block numbers can be the keys used to lookup Chunk Domain Block Numbers. This lookup can take place in a VBN to CDBN map, which can be managed by the Chunk-Manager above the Uberstore API.

To translate to a physical address, a translation function can convert a relative offset to an uber that maps to that relative address. From there, the translation function can compute an offset in the uber to get the address on the drive. This translation function can be:

Layout:=GetUber(Chunk_Domain,Chunk_Domain-
        _Block_Number)

Storage_Block_Address:=GetBlockPos(Layout,
        Chunk_Domain_Block_Number))

Figure 4:
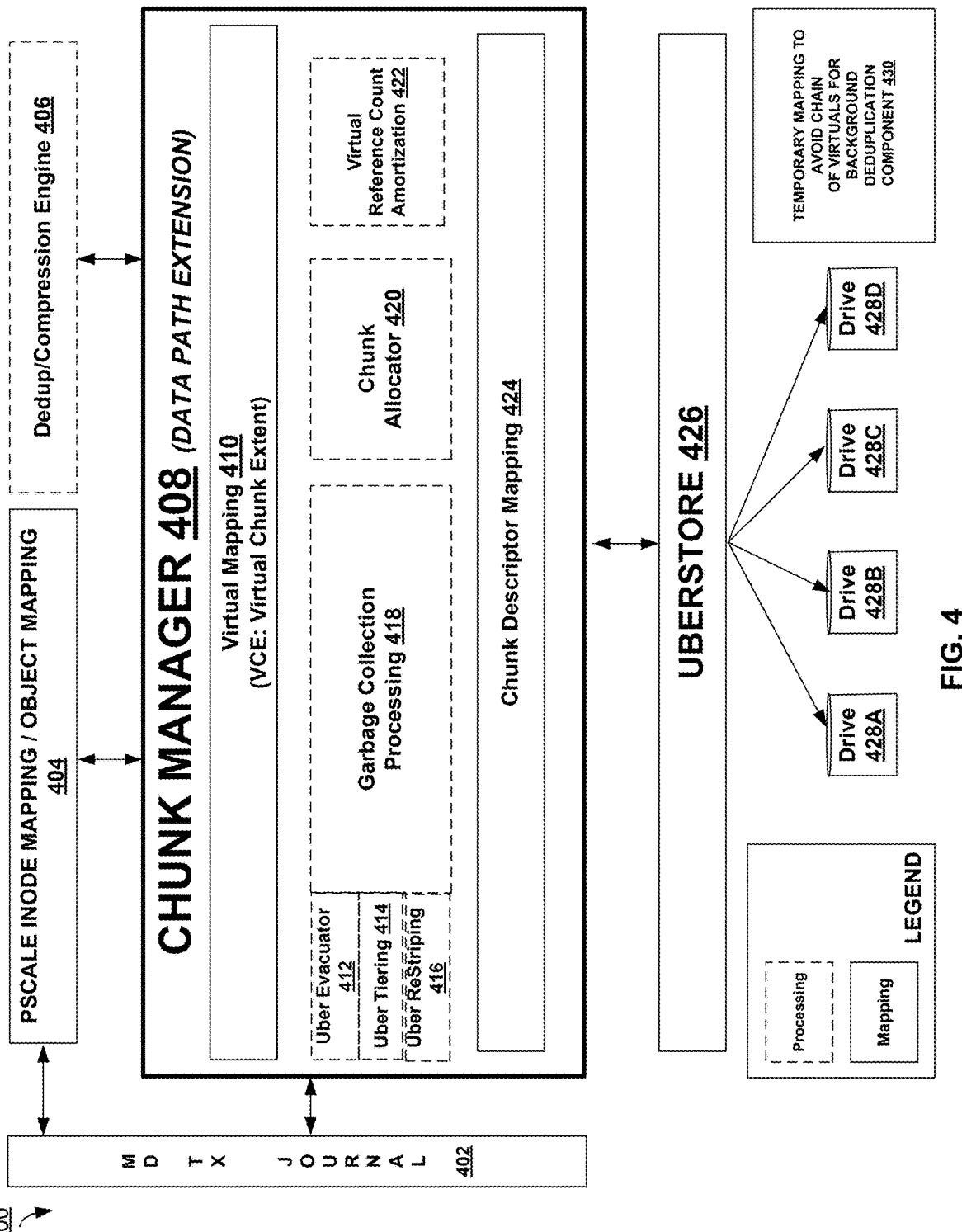
FIG. 4 illustrates another example system architecture of a chunkmanager in relation to other storage system components, and that can facilitate temporary mapping to avoid chain of virtuals for background deduplication, in accordance with an embodiment of this disclosure.

FIG. 4 illustrates another example system architecture 400 of a chunkmanager in relation to other storage system components, and that can facilitate temporary mapping to avoid chain of virtuals for background deduplication, in accordance with an embodiment of this disclosure. In some examples, part(s) of system architecture 400 can be used by system architecture 100 of FIG. 1 to facilitate temporary mapping to avoid chain of virtuals for background deduplication.

System architecture 400 illustrates an arrangement of a ChunkManager between a scale-out NAS and an UberStore. The ChunkManager can manage chunks (stripes), and can comprise mapping structures and processing.

System architecture 400 comprises MD transaction (Tx) journal 402 (a journal that stores updates to metadata in a transactional manner such that updates that modify multiple disjunct pieces of metadata can be executed in an atomic fashion (that is, either all updates happen, or no updates happen)), scale-out NAS inode mapping/object mapping 404, dedup/compression engine 406, chunkmanager 408, virtual mapping 410, uber evacuator 412, uber tiering 414, uber restriping 416, garbage collection processing 418, chunk allocator 420, virtual reference count amortization 422, chunk descriptor mapping 424, uberstore 426, drive 428A, drive 428B, drive 428C, drive 428D, and temporary mapping to avoid chain of virtuals for background deduplication component 430 (which can be similar to temporary mapping to avoid chain of virtuals for background deduplication component 108 of FIG. 1).

Figure 5:
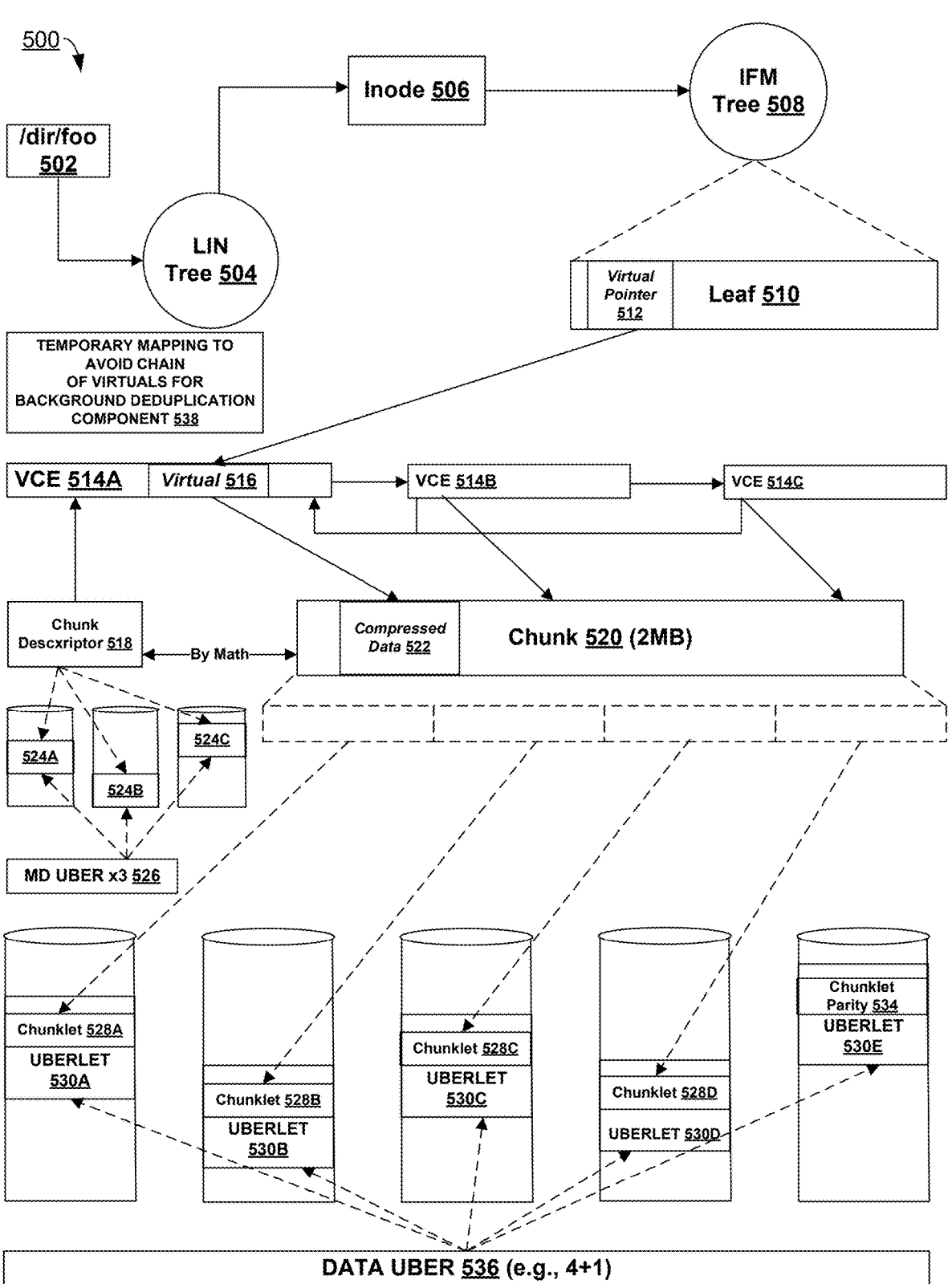
FIG. 5 illustrates another example system architecture of inode mapping in a chunkstore, and that can facilitate temporary mapping to avoid chain of virtuals for background deduplication, in accordance with an embodiment of this disclosure.

FIG. 5 illustrates another example system architecture 500 of inode mapping in a chunkstore, and that can facilitate temporary mapping to avoid chain of virtuals for background deduplication, in accordance with an embodiment of this disclosure. In some examples, part(s) of system architecture 500 can be used by system architecture 100 of FIG. 1 to facilitate temporary mapping to avoid chain of virtuals for background deduplication.

System architecture 500 illustrates an overview of mapping structures.

System architecture 500 comprises filesystem path 502, logical inode (LIN) tree 504, inode 506, IFM tree 508, leaf 510, virtual pointer 512, virtual chunk extent (VCE) 514A, VCE 514B, VCE 514C, virtual 516, chunk descriptor 518, chunk 520, compressed data 522, uberlet 524A, uberlet 524B, uberlet 524C, metadata uber x3 526, chunklet 528A (one piece of data on one device, where a chunk is stored across multiple devices, and can include parity information on other devices), chunklet 528B, chunklet 528C, chunklet 528D, uberlet 530A, uberlet 530B, uberlet 530C, uberlet 530D, uberlet 530E, chunklet parity 532, data uber 534, and temporary mapping to avoid chain of virtuals for background deduplication component 536 (which can be similar to temporary mapping to avoid chain of virtuals for background deduplication component 108 of FIG. 1).

Virtual pointer 512 can generally comprise a pointer to a virtual (e.g., virtual 516) per 8 KB data block. Virtual pointer 512 can comprise a VCE address, and an offset of the virtual in the VCE. In some examples, a VCE can comprise 32 virtuals. Virtual 516 can comprise an offset in a chunk, a length of the data (compressed of the 8 KB), and flags or information about the block.

A virtual chunk extent (VCE, e.g., VCE 514A) comprises a virtualization layer between inode mapping and the physical layer (Chunks, e.g., chunk 520), enabling features such as garbage collection (GC) and tiering. In an example, the size of one VCE can be 512 bytes (B), and one VCE can contain ~32 Virtuals (mapping 256 kilobytes (KB)), with 1

Virtual per File Block (8 KB). A VCE can be stored on a dedicated volume, such as a metadata (MD) "Chunk Domain."

A Chunk Descriptor 518 can comprise information about a Chunk, such as a checksum, and a backpointer to a first VCE in a chain of VCEs (Where VCE 514A, VCE 514B, and VCE 514C form a chain of VCEs by pointing to each other; and where a backpointer can generally comprise a pointer from one data structure to another data structure that is at a higher abstraction level). A Chunk Descriptor can be stored on a dedicated MD "Chunk Domain." A conversion between a Chunk address and a Chunk Descriptor address can be defined. In an example, a Chunk Descriptor can have a size of 64 B.

A leaf 510 of an inode Mapping Tree Pointer can comprise a pointer to a Virtual (e.g., virtual pointer 512, which can point to a particular VCE, and a virtual index within that VCE).

Figure 6:
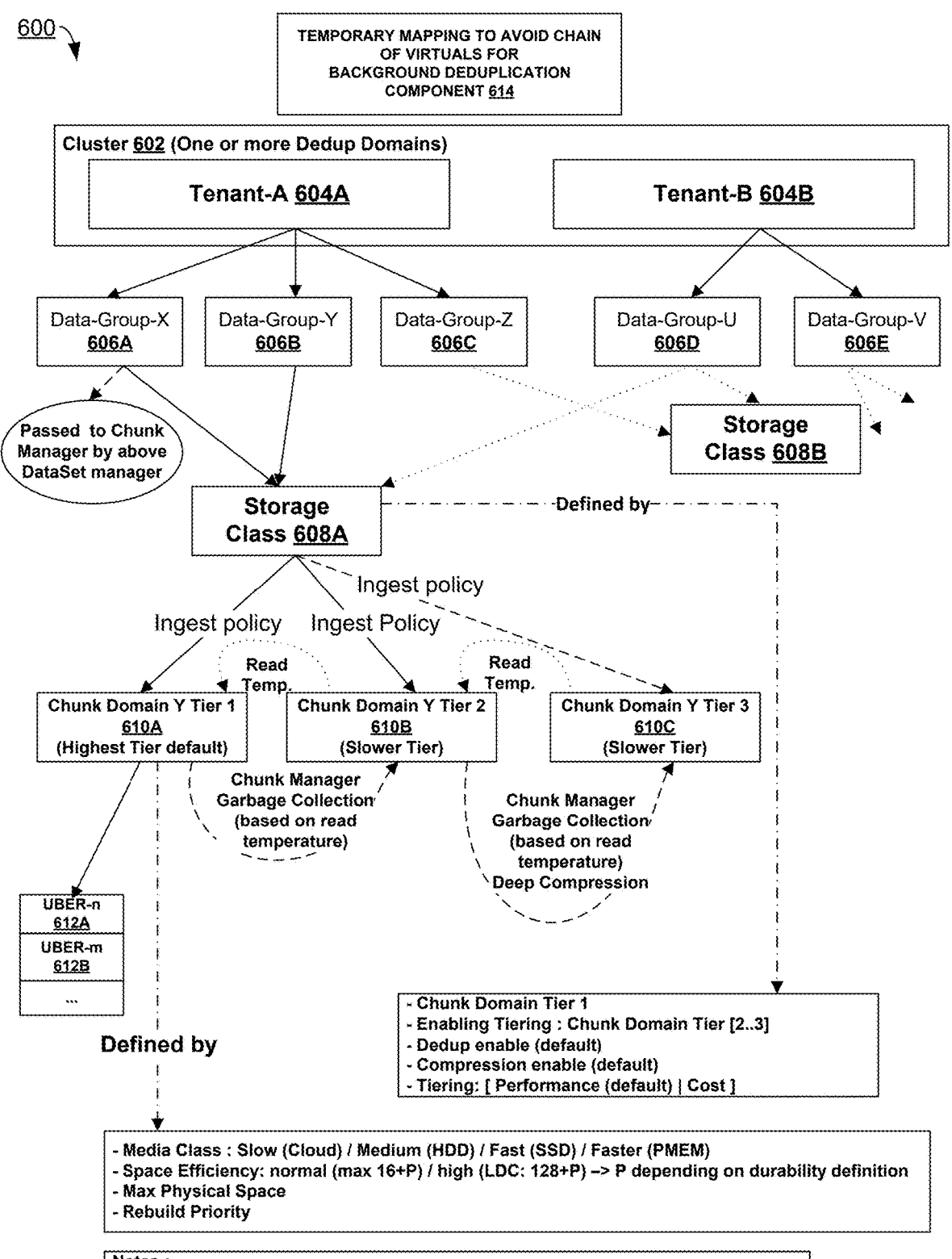
FIG. 6 illustrates another example system architecture of chunk domains in a storage cluster, and that can facilitate temporary mapping to avoid chain of virtuals for background deduplication, in accordance with an embodiment of this disclosure.

FIG. 6 illustrates another example system architecture 600 of chunk domains in a storage cluster, and that can facilitate temporary mapping to avoid chain of virtuals for background deduplication, in accordance with an embodiment of this disclosure. In some examples, part(s) of system architecture 600 can be used by system architecture 100 of FIG. 1 to facilitate temporary mapping to avoid chain of virtuals for background deduplication.

System architecture 600 depicts scale-out NAS storage, which can comprise tenants, data sets (data group), tiering, and/or dedup using a ChunkStore.

System architecture 600 comprises cluster 602, tenant-A 604A, tenant-B 604B, data-group-X 606A, data-group-Y 606B, data-group-Z 606C, data-group-U 606D, data-group-V 606E, storage class 608A, storage class 608B, chunk domain Y tier 1 610A, chunk domain Y tier 2 610B, chunk domain Y tier 3 610C, uber-n 612A, uber-m 612B, and temporary mapping to avoid chain of virtuals for background deduplication component 614 (which can be similar to temporary mapping to avoid chain of virtuals for background deduplication component 108 of FIG. 1).

A Dataset defines policies to apply on a set of data. Policies can include quota/snap/replication/tiering policies (and more). From the ChunkManager's perspective, it can be that only a sub-set of policies applied automatically, like tiering. Moreover, a ChunkManager can provide the mapping and metadata architecture to support dedup (deduplication) at a dedup domain level and/or software encryption of the group of data.

It can be that a ChunkManager is not aware of a Dataset. However, the ChunkManager can track in its metadata a "data group," to be able apply a policy or policy changes on tiering, dedup domain, or another policy that can be defined on a group of data. Above the ChunkManager, a mapping of Dataset to Data-group (e.g., data-group-X 606A) can exist, and writes to the ChunkManager can be tagged with the data-group ID.

Figure 7:
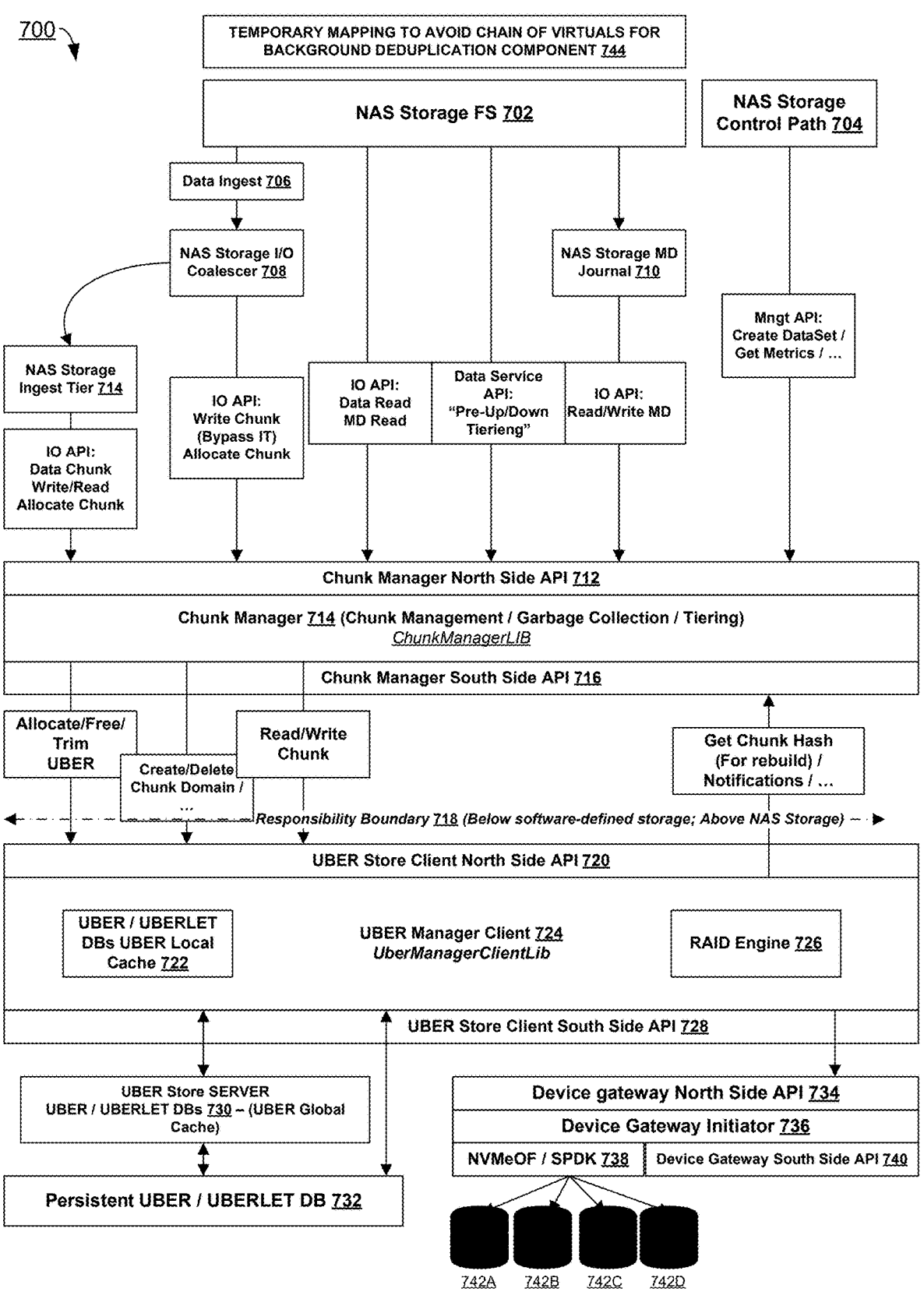
FIG. 7 illustrates another example system architecture of a chunk domain in a storage cluster, and that can facilitate temporary mapping to avoid chain of virtuals for background deduplication, in accordance with an embodiment of this disclosure.

FIG. 7 illustrates another example system architecture 700 of a chunk domain in a storage cluster, and that can facilitate temporary mapping to avoid chain of virtuals for background deduplication, in accordance with an embodiment of this disclosure. In some examples, part(s) of system architecture 700 can be used by system architecture 100 of FIG. 1 to facilitate temporary mapping to avoid chain of virtuals for background deduplication.

System architecture 700 illustrates a position of a ChunkManager in a data path.

System architecture 700 comprises NAS storage filesystem (FS) 702, NAS storage control path 704, NAS storage ingest tier 706, NAS storage I/O coalesce 708, NAS storage MD journal 710, chunkmanager north side API 712, chunkmanager 714, chunkmanager south side API 716, responsibility boundary 718, uberstore client north side API 720, uber manager client 722, uberstore client south side API 724, uber/uberlet DBs uber local cache 726, RAID engine 728, uberstore server uber/uberlet DBs 730, MDM 732, device gateway north side API 734, device gateway initiator 736, NVMe over fabric (OF)/storage performance development kit (SPDK) 738 (which can generally extend a NVMe device's block storage protocol over a storage network fabric), device gateway southside API 740, drive 742A, drive 742B, drive 742C, drive 742D, and temporary mapping to avoid chain of virtuals for background deduplication component 744 (which can be similar to temporary mapping to avoid chain of virtuals for background deduplication component 108 of FIG. 1).

The ChunkManager 714 can be part of the data path seating between inode low level of scale-out NAS storage data path (DP), and a ChunkStore Uberstore layer.

Figure 8:
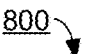
FIG. 8 illustrates another example system architecture of shadow virtual chunk extents (VCE) in a storage cluster, and that can facilitate temporary mapping to avoid chain of virtuals for background deduplication, in accordance with an embodiment of this disclosure.

FIG. 8 illustrates another example system architecture 800 of shadow virtual chunk extents (VCE) in a storage cluster, and that can facilitate temporary mapping to avoid chain of virtuals for background deduplication, in accordance with an embodiment of this disclosure. In some examples, part(s) of system architecture 800 can be used by system architecture 100 of FIG. 1 to facilitate temporary mapping to avoid chain of virtuals for background deduplication.

System architecture 800 comprises directory 802, LIN tree 804, inode A 806, IFM tree 808, IFM leaf 810, virtual pointer 812, shadow VCE 814A, shadow VCE 814B, logical backpointer 816A, logical backpointer 816B, VCE 818A, VCE 818B, VCE 818C, chunk descriptor 820, compressed data 822, chunk 824, and virtual 826.

Example Process Flows

FIG. 9 illustrates an example process flow 900 that can facilitate temporary mapping to avoid chain of virtuals for background deduplication, in accordance with an embodiment of this disclosure. In some examples, one or more embodiments of process flow 900 can be implemented by temporary mapping to avoid chain of virtuals for background deduplication component 108 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 1000 of FIG. 10, and/or process flow 1100 of FIG. 11.

Process flow 900 begins with 902, and moves to operation 904.

Operation 904 depicts ingesting a file into a log filesystem. Using the example of FIG. 1, this can comprise remote computer 106 issuing a command to computer system 102 to write a file to data storage 110. A log filesystem can generally comprise a filesystem that maintains a log of operations performed on it.

After operation 904, process flow 900 moves to operation 906.

Operation 906 depicts omitting a deduplication operation on the file at a time of the ingesting. That is, in some examples, deduplication can be performed on a file at a time it is ingested. In other examples, such as in process flow 900, deduplication can occur at a later time, and can be performed as a background process.

In some examples, the ingesting comprises flushing a write-back cache of the log filesystem, wherein the write-back cache stores the file. In some examples, flushing a write back cache can be considered a "near ingest" event.

After operation 906, process flow 900 moves to operation 908.

Operation 908 depicts, based on the ingesting, creating a first data structure that indicates a location of the file within the log filesystem, wherein the first data structure is persistent for a duration of the file being stored in the log filesystem. Using the example of FIG. 8, this first data structure can be virtual 826 (within VCE 818A, and which is in turn pointed to by virtual pointer 812, etc.).

After operation 908, process flow 900 moves to operation 910.

Operation 910 depicts, based on the omitting of the deduplication operation on the file at the time of the ingesting, creating a second data structure that indicates the location of the file within the log filesystem, wherein the second data structure comprises a logical backpointer to the file in the log filesystem, and wherein the second data structure is persistent until the deduplication operation is performed on the file. Continuing with the example of FIG. 8, this second data structure can be shadow VCE 814A, and the logical backpointer can be logical backpointer 816A. Logical backpointer 816A can point to inode A 806 and virtual pointer 812 (which indirectly points to the file in compressed data 822).

In some examples, the logical backpointer identifies a snap-iD (e.g., a file version) associated with the file in the log filesystem. In some examples, the logical backpointer identifies an inode associated with the file in the log filesystem. In some examples, the logical backpointer identifies an offset of a block within the file in the log filesystem. Using the example of FIG. 8, logical backpointer 816A comprises this information.

After operation 910, process flow 900 moves to operation 912.

Operation 912 depicts performing the deduplication operation subsequent to the creating of the second data structure, comprising parsing a chunk descriptor associated with a chunk of the file in the log filesystem to identify the second data structure, identifying any active first virtual mapping structures that are associated with the file in the log filesystem, identifying a deduplicated block associated with the file in the log filesystem, wherein the log filesystem implements block storage, updating a leaf mapping block of the file to point to a virtual pointer that identifies data associated with the deduplicated block that is stored in another block other than the deduplicated block, based on the logical backpointer of the second data structure, and after processing any second virtual mapping structures of the chunk, freeing the second data structure.

Continuing with the example of FIG. 8, the chunk descriptor can be chunk descriptor 820, the chunk can be chunk 824, the first virtual mapping structures can be a combination of shadow VCE 814A and shadow VCE 814B, and the leaf mapping block can be IFM leaf 810.

It can be that the existence of the second data structure that corresponds to a chunk indicates that the chunk has not been deduped.

In some examples, the performing of the deduplication operation further comprises performing a compression operation on the file in the log filesystem. That is, dedup can include compression.

Process flow 900 can be implemented to create a custom structure that enables/facilitates a "delayed dedup." It can also enable an ability to use different types of deduplication (e.g., similarity, partial, or block level deduplication), because from the leaf, a dedup engine can decide to use 1 or more pointers to deduped data blocks (e.g., a similarity dedup can use 2 pointers–1 to a dictionary, and 1 to data; block level dedup can use 1 pointer). A temporary structure can offer this flexibility for post-ingest dedup.

In some examples, the file is a first file, the deduplication operation is a first deduplication operation, the time is a first time, the location is a first location, and operation 912 comprises ingesting a second file into the log filesystem, wherein a second deduplication on the second file is performed at a second time of the ingesting of the second file, and based on the second deduplication on the second file being performed at a second time of the ingesting of the second file, refraining from creating a temporary data structure for the second file that indicates a second location of the second file within the log filesystem. That is, where dedup is performed on a file at ingest, creating a temporary data structure (like the second data structure in process flow 900) can be skipped for this file.

After operation 912, process flow 900 moves to 914, where process flow 900 ends.

FIG. 10 illustrates another example process flow 1000 that can facilitate temporary mapping to avoid chain of virtuals for background deduplication, in accordance with an embodiment of this disclosure. In some examples, one or more embodiments of process flow 1000 can be implemented by temporary mapping to avoid chain of virtuals for background deduplication component 108 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 900 of FIG. 9, and/or process flow 1100 of FIG. 11.

Process flow 1000 begins with 1002, and moves to operation 1004.

Operation 1004 depicts, based on ingesting a file into a log filesystem, creating a first data structure that indicates a location of the file within the log filesystem, wherein the first data structure is persistent for a duration of storage of the file in the log filesystem. In some examples, operation 1004 can be implemented in a similar manner as operations 904-908 of FIG. 9.

After operation 1004, process flow 1000 moves to operation 1006.

Operation 1006 depicts, based on omitting a deduplication operation on the file at a time of the ingesting, creating a second data structure that indicates the location of the file within the log filesystem, wherein the second data structure comprises a logical backpointer to the file in the log filesystem, and wherein the second data structure is persistent at least until the deduplication operation is performed on the file. In some examples, operation 1004 can be implemented in a similar manner as operation 910 of FIG. 9.

After operation 1006, process flow 900 moves to operation 1008.

Operation 1008 depicts performing the deduplication operation subsequent to the creating of the second data structure, comprising parsing a chunk descriptor associated with a chunk of the file in the log filesystem to identify the second data structure, identifying at least one active first virtual mapping structure that is associated with the file in the log filesystem, identifying a deduplicated block associated with the file in the log filesystem, wherein the log filesystem implements block storage, updating a leaf mapping block of the file to point to a virtual pointer that identifies data associated with the deduplicated block that is stored in another block, based on the logical backpointer of the second data structure, and after processing at least one second virtual mapping structure of the chunk, freeing the second data structure. In some examples, operation 1004 can be implemented in a similar manner as operation 912 of FIG. 9.

In some examples, the parsing of the chunk descriptor associated with the chunk of the file in the log filesystem to identify the second data structure comprises locating a backpointer in the chunk descriptor that identifies the second data structure. Using the example of FIG. 8, this backpointer can be the backpointer of chunk descriptor 820.

In some examples, the backpointer in the chunk descriptor that identifies the second data structure indicates that the deduplication operation has not been performed on the file. That is, the existence of the second data structure (temporary data structure) that is backpointed by the chunk descriptor can indicate that dedup/compression has not yet been done, where this second data structure can be deleted after performing dedup/compression.

In some examples, the deduplication operation is a first deduplication operation, the chunk descriptor is a first chunk descriptor, the backpointer is a first backpointer, and operation 1008 comprises, based on determining, from parsing a second chunk descriptor, that the second chunk descriptor omits a second backpointer to a temporary data structure, halting a second deduplication operation with respect to the second chunk descriptor. That is, where there is not a temporary backpointer in a chunk descriptor, that can indicate that dedup does not need to be performed (e.g., because it has already been performed).

In some examples, the identifying of the at least one active first virtual mapping structure that is associated with the file in the log filesystem comprises fetching a virtual chunk extent that comprises virtual pointers that point to the same chunk, and the virtual chunk extent identifies the at least one active first virtual mapping structure. The virtual chunk extent can be similar to shadow VCE 814A of FIG. 8.

In some examples, the identifying of the at least one active first virtual mapping structure is performed concurrently with the fetching of the virtual chunk extent. That is, when background dedup is performed, it parses the chunk descriptor, and if a temporal backpointer exists, it can fetch the temporal list of structures (like the VCE list) and in parallel can look for virtuals that are still active (refcount>=1)."

In some examples, respective active first virtual mapping structures of the at least one active first virtual mapping structures are active based on having respective reference counts that are equal to one. A refcount of 0 can indicate that a block is not used, and a refcount of >=2 can indicate that the block has already been used for deduplicating another block. In that case (refcount >=2), the block can be skipped since deduping that block could lose data for other files.

After operation 1008, process flow 1000 moves to 1010, where process flow 1000 ends.

FIG. 11 illustrates another example process flow 1100 that can facilitate temporary mapping to avoid chain of virtuals for background deduplication, in accordance with an embodiment of this disclosure. In some examples, one or more embodiments of process flow 1100 can be implemented by temporary mapping to avoid chain of virtuals for background deduplication component 108 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 900 of FIG. 9, and/or process flow 1000 of FIG. 10.

Process flow 1100 begins with 1102, and moves to operation 1104.

Operation 1104 depicts, based on ingesting a file into a filesystem, creating a first data structure that indicates a location of the file within the filesystem. In some examples, operation 1104 can be implemented in a similar manner as operations 904-908 of FIG. 9.

After operation 1104, process flow 1100 moves to operation 1106.

Operation 1106 depicts based on refraining from performing a deduplication operation on the file at a time of the ingesting, creating a second data structure that indicates the location of the file within the filesystem, wherein the second data structure comprises a logical backpointer to the file in the filesystem, and wherein the second data structure is persistent until the deduplication operation is performed on the file. In some examples, operation 1106 can be implemented in a similar manner as operation 910 of FIG. 9.

After operation 1106, process flow 1100 moves to operation 1108.

Operation 1108 depicts performing the deduplication operation subsequent to the creating of the second data structure, comprising identifying the second data structure from a chunk descriptor associated with a chunk of the file in the filesystem, identifying active first virtual mapping structures that are associated with the file in the filesystem, identifying a deduplicated block associated with the file in the filesystem, wherein the filesystem implements block storage, updating a leaf mapping block of the file to point to a virtual pointer that identifies data associated with the deduplicated block that is stored in another block, based on the logical backpointer of the second data structure, and after processing second virtual mapping structures of the chunk, freeing memory associated with the second data structure. In some examples, operation 1108 can be implemented in a similar manner as operation 912 of FIG. 9.

In some examples, operation 1108 comprises decrementing a reference count of a second virtual mapping structure of the second virtual mapping structures after processing the second virtual mapping structure. In some examples, operation 1108 comprises freeing the second virtual mapping structure based on the reference count being zero. That is, as part of dedup, a process can try to find a dedup-ed block and if it finds one, it can use the logical file backpointer stored in the temporary structure to update the leaf mapping block of the file to points to the virtual that has the same data. Then the old virtual can be decref'ed (or freed). Once all the virtuals of a chunk are processed, the temporary structure can be freed.

In some examples, the deduplication operation omits traversing a chain of multiple links between third virtual mapping structures. That is, using the temporary mapping structure can avoid linking virtuals together.

In some examples, the deduplication operation omits searching a name space of the filesystem. This can be performed by implementing the temporary mapping structure.

In some examples, the deduplication operation comprises a background deduplication operation. That is, the dedup can be performed after ingestion rather than at the time of ingestion.

After operation 1108, process flow 1100 moves to 1110, where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of computer system 102 and/or remote computer 106.

In some examples, computing environment 1200 can implement one or more embodiments of the process flows of FIGS. 9-11 to facilitate temporary mapping to avoid chain of virtuals for background deduplication.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media. With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples, and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

ingesting a file into a log filesystem;

omitting a deduplication operation on the file at a time of the ingesting;

based on the ingesting, creating a first data structure that indicates a location of the file within the log filesystem, wherein the first data structure is persistent for a duration of the file being stored in the log filesystem;

based on the omitting of the deduplication operation on the file at the time of the ingesting, creating a second data structure that indicates the location of the file within the log filesystem, wherein the second data structure comprises a logical backpointer to the file in the log filesystem, and wherein the second data structure is persistent until the deduplication operation is performed on the file; and performing the deduplication operation subsequent to the creating of the second data structure, comprising:

parsing a chunk descriptor associated with a chunk of the file in the log filesystem to identify the second data structure, identifying any active first virtual mapping structures that are associated with the file in the log filesystem, identifying a deduplicated block associated with the file in the log filesystem, wherein the log filesystem implements block storage, updating a leaf mapping block of the file to point to a virtual pointer that identifies data associated with the deduplicated block that is stored in another block other than the deduplicated block, based on the logical backpointer of the second data structure, and after processing any second virtual mapping structures of the chunk, freeing the second data structure.

2. The system of claim 1, wherein the logical backpointer identifies a snap-iD associated with the file in the log filesystem.

3. The system of claim 1, wherein the logical backpointer identifies an inode associated with the file in the log filesystem.

4. The system of claim 1, wherein the logical backpointer identifies an offset of a block within the file in the log filesystem.

5. The system of claim 1, wherein the performing of the deduplication operation further comprises:

performing a compression operation on the file in the log filesystem.

6. The system of claim 1, wherein the ingesting comprises flushing a write-back cache of the log filesystem, wherein the write-back cache stores the file.

7. The system of claim 1, wherein the file is a first file, wherein the deduplication operation is a first deduplication operation, wherein the time is a first time, wherein the location is a first location, and wherein the operations further comprise:

ingesting a second file into the log filesystem, wherein a second deduplication on the second file is performed at a second time of the ingesting of the second file; and based on the second deduplication on the second file being performed at a second time of the ingesting of the second file, refraining from creating a temporary data structure for the second file that indicates a second location of the second file within the log filesystem.

8. A method, comprising:

based on ingesting a file into a log filesystem, creating, by a system comprising at least one processor, a first data structure that indicates a location of the file within the log filesystem, wherein the first data structure is persistent for a duration of storage of the file in the log filesystem;

based on omitting a deduplication operation on the file at a time of the ingesting, creating, by the system, a second data structure that indicates the location of the file within the log filesystem, wherein the second data structure comprises a logical backpointer to the file in the log filesystem, and wherein the second data structure is persistent at least until the deduplication operation is performed on the file; and performing the deduplication operation subsequent to the creating of the second data structure, comprising:

parsing, by the system, a chunk descriptor associated with a chunk of the file in the log filesystem to identify the second data structure, identifying, by the system, at least one active first virtual mapping structure that is associated with the file in the log filesystem, identifying, by the system, a deduplicated block associated with the file in the log filesystem, wherein the log filesystem implements block storage, updating, by the system, a leaf mapping block of the file to point to a virtual pointer that identifies data associated with the deduplicated block that is stored in another block, based on the logical backpointer of the second data structure, and after processing at least one second virtual mapping structure of the chunk, freeing, by the system, the second data structure.

9. The method of claim 8, wherein the parsing of the chunk descriptor associated with the chunk of the file in the log filesystem to identify the second data structure comprises:

locating, by the system, a backpointer in the chunk descriptor that identifies the second data structure.

10. The method of claim 9, wherein the backpointer in the chunk descriptor that identifies the second data structure indicates that the deduplication operation has not been performed on the file.

11. The method of claim 9, wherein the deduplication operation is a first deduplication operation, wherein the chunk descriptor is a first chunk descriptor, wherein the backpointer is a first backpointer, and further comprising:

based on determining, from parsing a second chunk descriptor, that the second chunk descriptor omits a second backpointer to a temporary data structure, halting, by the system, a second deduplication operation with respect to the second chunk descriptor.

12. The method of claim 9, wherein the identifying of the at least one active first virtual mapping structure that is associated with the file in the log filesystem comprises fetching a virtual chunk extent that comprises virtual pointers that point to the same chunk, and wherein the virtual chunk extent identifies the at least one active first virtual mapping structure.

13. The method of claim 12, wherein the identifying of the at least one active first virtual mapping structure is performed concurrently with the fetching of the virtual chunk extent.

14. The method of claim 13, wherein respective active first virtual mapping structures of the at least one active first virtual mapping structures are active based on having respective reference counts that are equal to one.

15. A non-transitory computer-readable medium comprising instructions that, in response to execution, cause a system comprising at least one processor to perform operations, comprising:

based on ingesting a file into a filesystem, creating a first data structure that indicates a location of the file within the filesystem;

based on refraining from performing a deduplication operation on the file at a time of the ingesting, creating a second data structure that indicates the location of the file within the filesystem, wherein the second data structure comprises a logical backpointer to the file in the filesystem, and wherein the second data structure is persistent until the deduplication operation is performed on the file; and performing the deduplication operation subsequent to the creating of the second data structure, comprising:

identifying the second data structure from a chunk descriptor associated with a chunk of the file in the filesystem, identifying active first virtual mapping structures that are associated with the file in the filesystem, identifying a deduplicated block associated with the file in the filesystem, wherein the filesystem implements block storage, updating a leaf mapping block of the file to point to a virtual pointer that identifies data associated with the deduplicated block that is stored in another block, based on the logical backpointer of the second data structure, and after processing second virtual mapping structures of the chunk, freeing memory associated with the second data structure.

16. The non-transitory computer-readable medium of claim 15, wherein the operations further comprise:

decrementing a reference count of a second virtual mapping structure of the second virtual mapping structures after processing the second virtual mapping structure.

17. The non-transitory computer-readable medium of claim 16, wherein the operations further comprise:

freeing the second virtual mapping structure based on the reference count being zero.

18. The non-transitory computer-readable medium of claim 15, wherein the deduplication operation omits traversing a chain of multiple links between third virtual mapping structures.

19. The non-transitory computer-readable medium of claim 15, wherein the deduplication operation omits searching a name space of the filesystem.

20. The non-transitory computer-readable medium of claim 15, wherein the deduplication operation comprises a background deduplication operation.

* * * * *